(12) United States Patent
Deshpande

(10) Patent No.: US 11,979,611 B2
(45) Date of Patent: May 7, 2024

(54) SYSTEMS AND METHODS FOR SIGNALING TEMPORAL SUB-LAYER INFORMATION IN VIDEO CODING

(71) Applicant: SHARP KABUSHIKI KAISHA, Sakai (JP)

(72) Inventor: Sachin G. Deshpande, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 190 days.

(21) Appl. No.: 17/640,800

(22) PCT Filed: Sep. 2, 2020

(86) PCT No.: PCT/JP2020/033333
§ 371 (c)(1),
(2) Date: Mar. 4, 2022

(87) PCT Pub. No.: WO2021/045128
PCT Pub. Date: Mar. 11, 2021

(65) Prior Publication Data
US 2022/0345745 A1    Oct. 27, 2022

Related U.S. Application Data

(60) Provisional application No. 62/903,909, filed on Sep. 22, 2019, provisional application No. 62/902,177, (Continued)

(51) Int. Cl.
*H04N 19/70* (2014.01)
*H04N 19/159* (2014.01)
(Continued)

(52) U.S. Cl.
CPC .......... *H04N 19/70* (2014.11); *H04N 19/159* (2014.11); *H04N 19/172* (2014.11); *H04N 19/1883* (2014.11)

(58) Field of Classification Search
CPC .... H04N 19/70; H04N 19/159; H04N 19/172; H04N 19/1883
(Continued)

(56) References Cited

U.S. PATENT DOCUMENTS

2017/0041615 A1* 2/2017 Lee ...................... H04N 19/105

OTHER PUBLICATIONS

International Telecommunication Union, "Advanced video coding for generic audiovisual services", Series H: Audiovisual and Multimedia Systems, Infrastructure of audiovisual services—Coding of moving video, Telecommunication Standardization Sector of ITU, Recommendation ITU-T H.264, Aug. 2021.
(Continued)

*Primary Examiner* — Allen C Wong
(74) *Attorney, Agent, or Firm* — ScienBiziP, P.C.

(57) ABSTRACT

This disclosure relates to video coding and more particularly to techniques for signaling temporal sub-layer information for coded video. According to an aspect of an invention, a range of a value of a third syntax element in a sequence parameter set is determined based on whether the sequence parameter set refers to a video parameter set, wherein the third syntax element specifies a maximum number of temporal sub-layers that is present in each coded video sequence referring to the sequence parameter set.

2 Claims, 6 Drawing Sheets

Related U.S. Application Data filed on Sep. 18, 2019, provisional application No. 62/897,238, filed on Sep. 6, 2019.

(51) Int. Cl.
*H04N 19/169* (2014.01)
*H04N 19/172* (2014.01)

(58) Field of Classification Search
USPC .................................................. 375/240.26
See application file for complete search history.

(56) References Cited

OTHER PUBLICATIONS

International Telecommunication Union, "High efficiency video coding", Series H: Audiovisual and Multimedia Systems, Infrastructure of audiovisual services—Coding of moving video, Telecommunication Standardization Sector of ITU, Recommendation ITU-T H.265, Dec. 2016.

Jianle Chen et al., "Algorithm Description of Joint Exploration Test Model 7 (JEM 7)", JVET-G1001-v1 Joint Video Exploration Team (JVET) of ITU-T SG 16 WP 3 and ISO/IEC JTC 1/SC 29/WG 11 7th Meeting: Torino, IT, Jul. 13-21, 2017.

Benjamin Bross, "Versatile Video Coding (Draft 1)", JVET-J1001-v2 Joint Video Experts Team (JVET) of ITU-T SG 16 WP 3 and ISO/IEC JTC 1/SC 29/WG 11 10th Meeting: San Diego, US, Apr. 10-20, 2018.

Benjamin Bross et al., "Versatile Video Coding (Draft 6)", JVET-O2001-vE Joint Video Experts Team (JVET) of ITU-T SG 16 WP 3 and ISO/IEC JTC 1/SC 29/WG 11 15th Meeting: Gothenburg, SE, Jul. 3-12, 2019.

Recommendation ITU-T H.265 (Dec. 2016), "High efficiency video coding", Dec. 2016, pp. 33-35, 75 7.3.2.1, 7.3.2.2.1, 7.4.3.2.1.

Benjamin Bross et al., "Versatile Video Coding (Draft 6)" Joint Video Experts Team (JVET), Jul. 31, 2019, pp. 36-37,86-87, [JVET-O2001-vE] (version 14) 7.3.2.2, 7.3.2.3, 7.4.3.2, 7.4.3.3.

Yongjin Cho et al., "MV-HEVC/SHVC HLS: Comments on general decoding process and selection of CPB operation in the HRD operation", JCTVC-Q0055 Joint Collaborative Team on Video Coding (JCT-VC) of ITU-T SG 16 WP 3 and ISO/IEC JTC 1/SC 29/WG 11 17th Meeting: Valencia, ES, Mar. 27-Apr. 4, 2014.

\* cited by examiner

SYSTEMS AND METHODS FOR SIGNALING TEMPORAL SUB-LAYER INFORMATION IN VIDEO CODING

TECHNICAL FIELD

This disclosure relates to video coding and more particularly to techniques for signaling reference picture lists for coded video.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the 10th Meeting of ISO/IEC JTC1/SC29/WG11 16-20 Apr. 2018, San Diego, CA. From the multiple descriptions of video coding tools, a resulting initial draft text of a video coding specification is described in "Versatile Video Coding (Draft 1)," 10th Meeting of ISO/IEC JTC1/SC29/WG11 16-20 Apr. 2018, San Diego, CA, document JVET-J1001-v2, which is incorporated by reference herein, and referred to as JVET-J1001. The current development of a next generation video coding standard by the VCEG and MPEG is referred to as the Versatile Video Coding (VVC) project. "Versatile Video Coding (Draft 6)," 15th Meeting of ISO/IEC JTC1/SC29/WG11 3-12 Jul. 2019, Gothenburg, SE, document JVET-O2001-vE, which is incorporated by reference herein, and referred to as JVET-O2001, represents the current iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY OF INVENTION

In one example, a method of decoding video data, the method comprising: receiving a video parameter set; parsing a first syntax element in the video parameter set, wherein the first syntax element plus one specifies a maximum number of temporal sub-layers that may be present in a layer specified by the video parameter set; receiving a sequence parameter set; parsing a second syntax element in the sequence parameter set, wherein the second syntax element specifies the sequence parameter set refers to the video parameter set or the sequence parameter set does not refer to the video parameter set; and parsing a third syntax element in the sequence parameter set, wherein the third syntax element plus one specifies a maximum number of temporal sub-layers that is present in each coded video sequence referring to the sequence parameter set, wherein: a value of the third syntax element is in a range of 0 to the first syntax element, in the case that the second syntax element is greater than zero, and a value of the third syntax element is in a range of 0 to 6, in a case that the second syntax element is equal to zero.

In one example, a method of encoding video data, the method comprising: signaling a video parameter set; and signaling a sequence parameter set, wherein: the video parameter set includes a first syntax element in the video parameter set, wherein the first syntax element plus one specifies a maximum number of temporal sub-layers that may be present in a layer specified by the video parameter set, the sequence parameter set includes (i) a second syntax element, wherein the second syntax element specifies the sequence parameter set refers to the video parameter set or the sequence parameter set does not refer to the video parameter set and (ii) a third syntax element, wherein the third syntax element plus one specifies a maximum number of temporal sub-layers that is present in each coded video sequence referring to the sequence parameter set, a value of the third syntax element is in a range of 0 to the first syntax element, in the case that the second syntax element is greater than zero, and a value of the third syntax element is in a range of 0 to 6, in a case that the second syntax element is equal to zero.

In one example, a device comprising: a processor, and a memory associated with the processor; wherein the processor is configured to perform the following steps: receiving a video parameter set; parsing a first syntax element in the video parameter set, wherein the first syntax element plus one specifies a maximum number of temporal sub-layers that may be present in a layer specified by the video parameter set; receiving a sequence parameter set; parsing a second syntax element in the sequence parameter set, wherein the second syntax element specifies the sequence parameter set refers to the video parameter set or the sequence parameter set does not refer to the video parameter set; and parsing a third syntax element in the sequence parameter set, wherein the third syntax element plus one specifies a maximum number of temporal sub-layers that is present in each coded video sequence referring to the sequence parameter set, wherein: a value of the third syntax element is in a range of 0 to the first syntax element, in the case that the second syntax element is greater than zero, and a value of the third syntax element is in a range of 0 to 6, in a case that the second syntax element is equal to zero.

DESCRIPTION OF EMBODIMENTS

Figure 1:
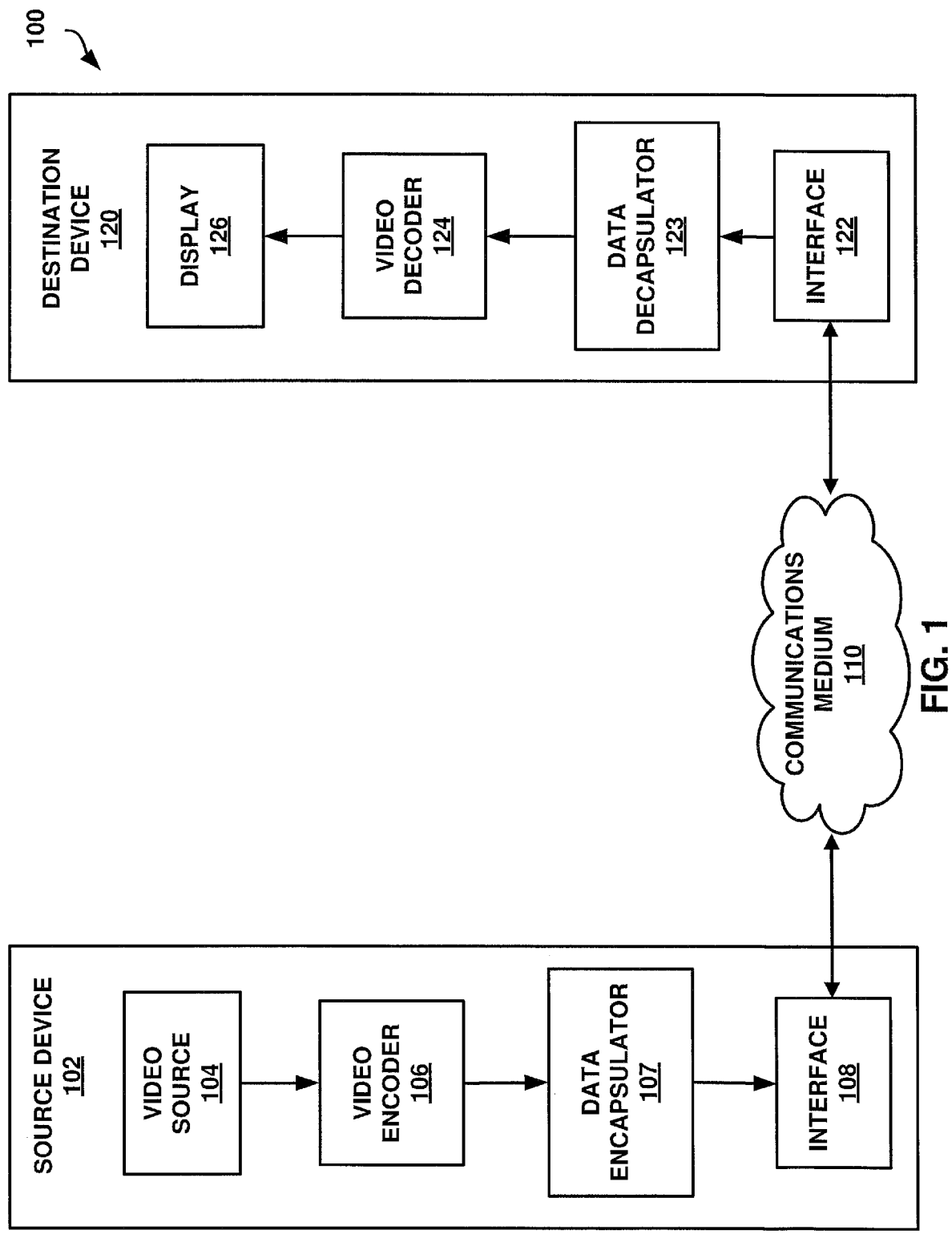
FIG. 1 is a block diagram illustrating an example of a system that may be configured to encode and decode video data according to one or more techniques of this this disclosure.

In general, this disclosure describes various techniques for coding video data. In particular, this disclosure describes techniques for signaling reference picture lists for coded video data. It should be noted that although techniques of this disclosure are described with respect to ITU-T H.264, ITU-T H.265, JEM, and JVET-O2001, the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, and JVET-O2001. Thus, reference to ITU-T H.264, ITU-T H.265, JEM, and/or JVET-O2001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of signaling a reference picture list for video data, the method comprises signaling two bits having values which indicate whether an entry in a reference picture list is one of: a short term reference picture entry having a value greater than or equal to 0, a short term reference picture entry having a value less 0, a inter layer reference picture, or a long term reference picture entry.

In one example, a device comprises one or more processors configured to signal two bits having values which indicate whether an entry in a reference picture list is one of: a short term reference picture entry having a value greater than or equal to 0, a short term reference picture entry having a value less 0, a inter layer reference picture, or a long term reference picture entry.

In one example, a non-transitory computer-readable storage medium comprises instructions stored thereon that, when executed, cause one or more processors of a device to signal two bits having values which indicate whether an entry in a reference picture list is one of: a short term reference picture entry having a value greater than or equal to 0, a short term reference picture entry having a value less 0, a inter layer reference picture, or a long term reference picture entry.

In one example, an apparatus comprises means for signaling two bits having values which indicate whether an entry in a reference picture list is one of: a short term reference picture entry having a value greater than or equal to 0, a short term reference picture entry having a value less 0, a inter layer reference picture, or a long term reference picture entry.

In one example, a method of decoding video data comprises parsing two bits having values which indicate whether an entry in a reference picture list is one of: a short term reference picture entry having a value greater than or equal to 0, a short term reference picture entry having a value less 0, a inter layer reference picture, or a long term reference picture entry.

In one example, a device comprises one or more processors configured to parse two bits having values which indicate whether an entry in a reference picture list is one of: a short term reference picture entry having a value greater than or equal to 0, a short term reference picture entry having a value less 0, a inter layer reference picture, or a long term reference picture entry.

In one example, a non-transitory computer-readable storage medium comprises instructions stored thereon that, when executed, cause one or more processors of a device to parse two bits having values which indicate whether an entry in a reference picture list is one of: a short term reference picture entry having a value greater than or equal to 0, a short term reference picture entry having a value less 0, a inter layer reference picture, or a long term reference picture entry.

In one example, an apparatus comprises means for parsing two bits having values which indicate whether an entry in a reference picture list is one of: a short term reference picture entry having a value greater than or equal to 0, a short term reference picture entry having a value less 0, a inter layer reference picture, or a long term reference picture entry.

The details of one or more examples are set forth in the accompanying drawings and the description below. Other features, objects, and advantages will be apparent from the description and drawings, and from the claims.

Video content includes video sequences comprised of a series of frames (or pictures). A series of frames may also be referred to as a group of pictures (GOP). Each video frame or picture may be divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may by halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-O2001, CTUs are partitioned according a quadtree plus multi-type tree (QTMT or QT+MTT) structure. The QTMT in JVET-O2001 is similar to the QTBT in JEM. However, in JVET-O2001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge.

As described above, each video frame or picture may be divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

Figure 2:
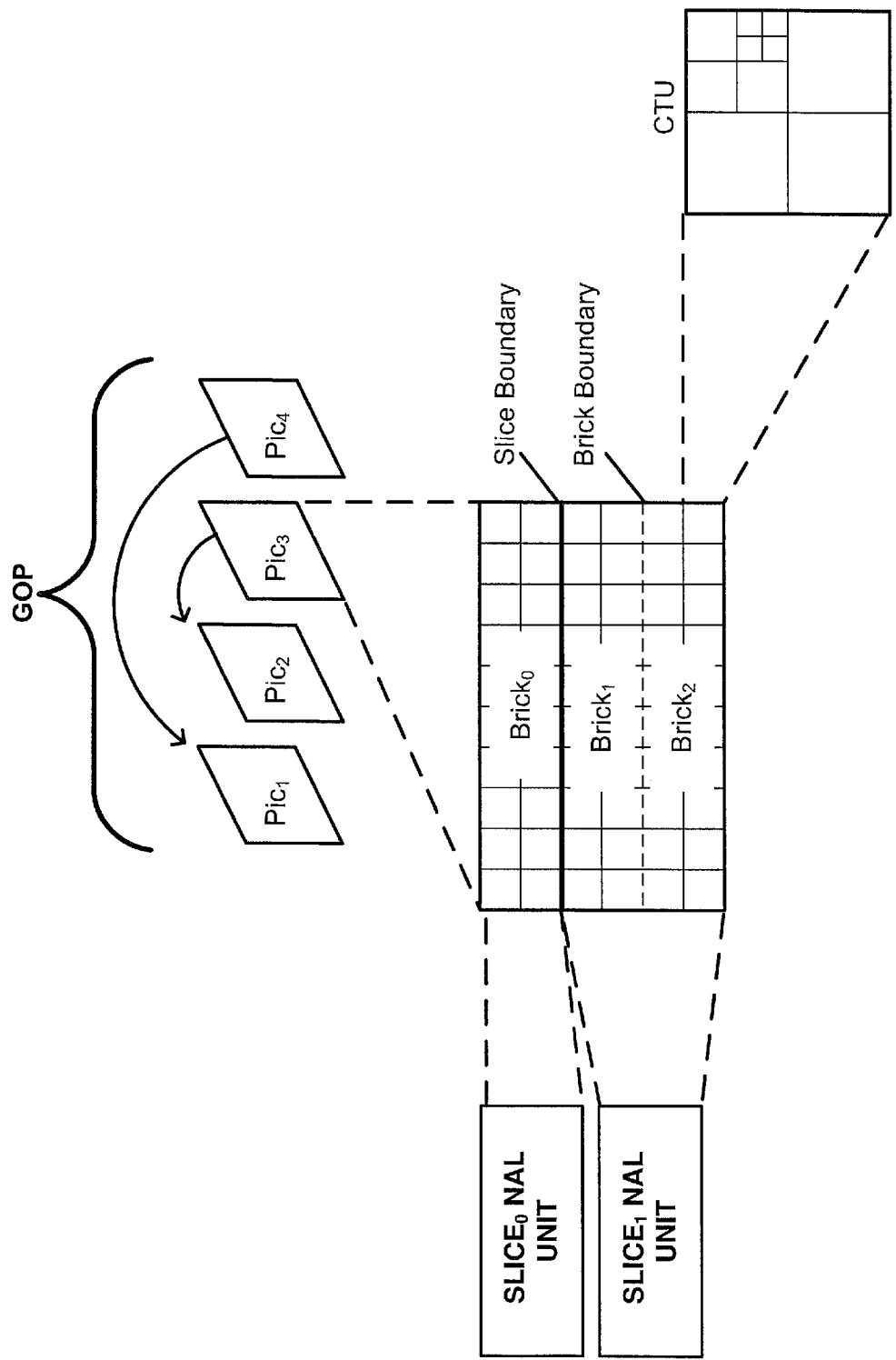
FIG. 2 is a conceptual diagram illustrating coded video data and corresponding data structures according to one or more techniques of this this disclosure.

With respect to JVET-O2001, slices are required to consist of an integer number of bricks instead of only being required to consist of an integer number of CTUs. In JVET-O2001, a brick is a rectangular region of CTU rows within a particular tile in a picture. Further, in JVET-O2001, a tile may be partitioned into multiple bricks, each of which consisting of one or more CTU rows within the tile. A tile that is not partitioned into multiple bricks is also referred to as a brick. However, a brick that is a true subset of a tile is not referred to as a tile. As such, a slice including a set of CTUs which do not form a rectangular region of a picture may or may not be supported in some video coding techniques. Further, it should be noted that in some cases, a slice may be required to consist of an integer number of complete tiles and in this case is referred to as a tile group. The techniques described herein may applicable to bricks, slices, tiles, and/or tile groups. FIG. 2 is a conceptual diagram illustrating an example of a group of pictures including slices. In the example illustrated in FIG. 2, $Pic_3$ is illustrated as including two slices (i.e., $Slice_0$ and $Slice_1$). In the example illustrated in FIG. 2, $Slice_0$ includes one brick, i.e., $Brick_0$ and $Slice_1$ includes two bricks, i.e., $Brick_1$ and $Brick_2$. It should be noted that in some cases, $Slice_0$ and $Slice_1$ may meet the requirements of and be classified as tiles and/or tile groups.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 2, $Pic_3$ is illustrated as referencing $Pic_2$. Similarly, $Pic_4$ is illustrated as referencing $Pic_1$. With respect to FIG. 2 assuming the picture number corresponds to the decoding order the DPB would be populated as follows: after decoding $Pic_1$, the DPB would include $\{Pic_1\}$; at the onset of decoding $Pic_2$, the DPB would include $\{Pic_1\}$; after decoding $Pic_2$, the DPB would include $\{Pic_1, Pic_2\}$; at the onset of decoding $Pic_3$, the DPB would include $\{Pic_1, Pic_2\}$. $Pic_3$ would then be decoded with reference to $Pic_2$ and after decoding $Pic_3$, the DPB would include $\{Pic_1, Pic_2, Pic_3\}$. At the onset of decoding $Pic_4$, pictures $Pic_2$ and $Pic_3$ would be marked for removal from the DPB, as they are not needed for decoding $Pic_4$ (or any subsequent pictures, not shown) and assuming $Pic_2$ and $Pic_3$ have been output, the DPB would be updated to include {$Pic_1$}. $Pic_4$ would then be decoded with referencing $Pic_1$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-O2001, a CU is associated with a transform unit (TU) structure having its root at the CU level. That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

With respect to the equations used herein, the following arithmetic operators may be used:

+ Addition

− Subtraction

\* Multiplication, including matrix multiplication $x^y$ Exponentiation. Specifies x to the power of y. In other contexts, such notation is used for superscripting not intended for interpretation as exponentiation.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

$$\frac{x}{y}$$

Used to denote division in mathematical equations where no truncation or rounding is intended.

Further, the following mathematical functions may be used:

Log2(x) the base-2 logarithm of x;

$$\text{Min}(x, y) = \begin{cases} x; & x <= y \\ y; & x > y \end{cases};$$

$$\text{Max}(x, y) = \begin{cases} x; & x >= y \\ y; & x < y \end{cases}$$

Ceil(x) the smallest integer greater than or equal to x.

With respect to the example syntax used herein, the following definitions of logical operators may be applied:

x && y Boolean logical "and" of x and y
x y Boolean logical "or" of x and y
! Boolean logical "not"
x?y:z If x is TRUE or not equal to 0, evaluates to the value of y; otherwise, evaluates to the value of z.

Further, the following relational operators may be applied:

\> Greater than
\>= Greater than or equal to
< Less than
<= Less than or equal to
== Equal to
!= Not equal to Further, it should be noted that in the syntax descriptors used herein, the following descriptors may be applied:

b(8): byte having any pattern of bit string (8 bits). The parsing process for this descriptor is specified by the return value of the function read_bits(8).

f(n): fixed-pattern bit string using n bits written (from left to right) with the left bit first. The parsing process for this descriptor is specified by the return value of the function read_bits(n).

se(v): signed integer 0-th order Exp-Golomb-coded syntax element with the left bit first.

tb(v): truncated binary using up to maxVal bits with maxVal defined in the semantics of the syntax element.

tu(v): truncated unary using up to maxVal bits with maxVal defined in the semantics of the syntax element.

u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.

ue(v): unsigned integer 0-th order Exp-Golomb-coded syntax element with the left bit first.

As described above, video content includes video sequences comprised of a series of frames (or pictures) and each video frame or picture may be divided into one or more regions. A coded video sequence (CVS) may be encapsulated (or structured) as a sequence of access units, where each access unit includes video data structured as network abstraction layer (NAL) units. It should be noted that in some cases, an access unit may be required to contain exactly one coded picture. A bitstream may be described as including a sequence of NAL units forming one or more CVSs. It should be noted that multi-layer extensions enable a video presentation to include a base layer and one or more additional enhancement layers. For example, a base layer may enable a video presentation having a basic level of quality (e.g., a High Definition rendering and/or a 30 Hz frame rate) to be presented and an enhancement layer may enable a video presentation having an enhanced level of quality (e.g., an Ultra High Definition rendering and/or a 60 Hz frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. Each NAL unit may include an identifier indicating a layer of video data the NAL unit is associated with. It should be noted that sub-bitstream extraction may refer to a process where a device receiving a compliant or conforming bitstream forms a new compliant or conforming bitstream by discarding and/or modifying data in the received bitstream. For example, sub-bitstream extraction may be used to form a new compliant or conforming bitstream corresponding to a particular representation of video (e.g., a high quality representation). Layers may also be coded independent of each other. In this case, there may not be an inter-layer prediction between two layers.

Referring to the example illustrated in FIG. 2, each slice of video data included in $Pic_3$ (i.e., $Slice_0$ and $Slice_1$) is illustrated as being encapsulated in a NAL unit. In JVET-O2001, each of a video sequence, a GOP, a picture, a slice, and CTU may be associated with metadata that describes video coding properties. JVET-O2001 defines parameters sets that may be used to describe video data and/or video coding properties. In particular, JVET-O2001 includes the following five types of parameter sets: decoding parameter set (DPS), video parameter set (VPS), sequence parameter set (SPS), picture parameter set (PPS), and adaption parameter set (APS). In JVET-O2001, parameter sets may be encapsulated as a special type of NAL unit or may be signaled as a message. NAL units including coded video data (e.g., a slice) may be referred to as VCL (Video Coding Layer) NAL units and NAL units including metadata (e.g., parameter sets) may be referred to as non-VCL NAL units. Further, JVET-O2001 enables supplemental enhancement information (SEI) messages to be signaled. In JVET-O2001, SEI messages assist in processes related to decoding, display or other purposes, however, SEI messages may not be required for constructing the luma or chroma samples by the decoding process. In JVET-O2001, SEI messages may be signaled in a bitstream using non-VCL NAL units. Further, SEI messages may be conveyed by some means other than by being present in the bitstream (i.e., signaled out-of-band).

Table 1A illustrates the syntax for the video parameter set provided in JVET-O2001.

TABLE 1A

| | Descriptor |
|---|---|
| video_parameter_set_rbsp( ) { | |
|   vps_video_parameter_set_id | u(4) |
|   vps_max_layers_minus1 | u(6) |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) | |
|         for( j = 0; j < i; j++ ) | |
|           vps_direct_dependency_flag[ i ][ j ] | u(1) |
|     } | |
|   } | |

TABLE 1A-continued

| | Descriptor |
|---|---|
| if( vps_max_layers_minus1 > 0 ) { | |
|   vps_output_layers_mode | u(2) |
|   if( vps_output_layers_mode == 2 ) | |
|     for( i = 0; i < vps_max_layers_minus1; i++ ) | |
|       vps_output_layer_flag[ i ] | u(1) |
| } | |
| vps_constraint_info_present flag | u(1) |
| vps_reserved_zero_7bits | u(7) |
| if( vps_constraint_info_present_flag ) | |
|   general_constraint_info( ) | |
| vps_extension_flag | u(1) |
| if( vps_extension_flag ) | |
|   while( more_rbsp_data( ) ) | |
|     vps_extension_data flag | u(1) |
| rbsp_trailing_bits( ) | |
| } | |

With respect to Table 1A, JVET-O2001 provides the following semantics.

A VPS RBSP shall be available to the decoding process prior to it being referred, included in at least one access unit with TemporalId equal to 0 or provided through external means, and the VPS NAL unit containing the VPS RBSP shall have nuh_layer_id equal to vps_layer_id[0].

All VPS NAL units with a particular value of vps_video_parameter_set_id in a CVS shall have the same content.

vps_video_parameter_set_id provides an identifier for the VPS for reference by other syntax elements.

vps_max_layers_minus1 plus 1 specifies the maximum allowed number of layers in each CVS referring to the VPS.

vps_all_independent_layers_flag equal to 1 specifies that all layers in the CVS are independently coded without using inter-layer prediction. vps_all_independent_layers_flag equal to 0 specifies that one or more of the layers in the CVS may use inter-layer prediction. When not present, the value of vps_all_independent_layers_flag is inferred to be equal to 1. When vps_all_independent_layers_flag is equal to 1, the value of vps_independent_layer_flag[i] is inferred to be equal to 1. When vps_all_independent_layers_flag is equal to 0, the value of vps_independent_layer_flag[0] is inferred to be equal to 1.

vps_layer_id[i] specifies the nuh_layer_id value of the i-th layer. For any two non-negative integer values of m and n, when m is less than n, the value of vps_layer_id[m] shall be less than vps_layer_id[n].

vps_independent_layer_flag[i] equal to 1 specifies that the layer with index i does not use inter-layer prediction. vps_independent_layer_flag[i] equal to 0 specifies that the layer with index i may use inter-layer prediction and vps_layer_dependency_flag[i] is present in VPS.

vps_direct_dependency_flag[i][j] equal to 0 specifies that the layer with index j is not a direct reference layer for the layer with index i. vps_direct_dependency_flag[i][j] equal to 1 specifies that the layer with index j is a direct reference layer for the layer with index i. When vps_direct_dependency_flag[i][j] is not present for i and j in the range of 0 to vps_max_layers_minus1, inclusive, it is inferred to be equal to 0.

The variable DirectDependentLayerIdx[i][j], specifying the j-th direct dependent layer of the i-th layer, is derived as follows:

```
for( i = 1; i < vps_max_layers_minus1; i— — )
    if( !vps_independent_layer_flag[ i ] )
        for j = i, k = 0; j > = 0; j— — )
            if( vps_direct_dependency_flag[ i ][ j ] )
                DirectDependentLayerIdx[ i ][ k++ ] = j
```

The variable GeneralLayerIdx[i], specifying the layer index of the layer with nuh_layer_id equal to vps_layer_id[i], is derived as follows:

```
for( i = 0; i <= vps_max_layers_minus1; i++ )
    GeneralLayerIdx[ vps_layer_id[ i ] ] = i
``` vps_output_layers_mode equal to 0 specifies that only the highest layer is output. vps_output_layer_mode equal to 1 specifies that all layers are output. vps_output_layer_mode equal to 2 specifies that the layers that are output are the layers with vps_output_layer_flag[i] equal to 1. The value of vps_output_layers_mode shall be in the range of 0 to 2, inclusive. The value 3 of vps_output_layer_mode is reserved for future use by ITU-T|ISO/IEC.

vps_output_layer_flag[i] equal to 1 specifies that the i-th layer is output. vps_output_layer_flag[i] equal to 0 specifies that the i-th layer is not output. The list OutputLayerFlag[i], for which the value 1 specifies that the i-th layer is output and the value 0 specified that the i-th layer is not output, is derived as follows:

```
OutputLayerFlag[ vps_max_layers_minus1 ] =1
for( i = 0; i < vps_max_layers_minus1; i++ )
    if( vps_output_layer_mode == 0 )
        OutputLayerFlag[ i ] = 0
    else if( vps_output_layer_mode == 1)
        OutputLayerFlag[ i ] = 1
    else
        OutputLayerFlag[ i ] = vps_output_layer_flag[ i ]
``` vps_constraint_info_present_flag equal to 1 specifies that the general_constraint_info( ) syntax structure is present in the VPS. vps_constraint_info_present_flag equal to 0 specifies that the general_constraint_info( ) syntax structure is not present in the VPS.

vps_reserved_zero_7 bits shall be equal to 0 in bitstreams conforming to this version of this Specification. Other values for vps_reserved_zero_7 bits are reserved for future use by ITU-T I ISO/IEC. Decoders shall ignore the value of vps_reserved_zero_7 bits.

vps_extension_flag equal to 0 specifies that no vps_extension_data_flag syntax elements are present in the VPS RBSP syntax structure. vps_extension_flag equal to 1 specifies that there are vps_extension_data_flag syntax elements present in the VPS RBSP syntax structure.

vps_extension_data_flag may have any value. Its presence and value do not affect decoder conformance to profiles specified in this version of this Specification. Decoders conforming to this version of this Specification shall ignore all vps_extension_data_flag syntax elements.

An access unit may be called a layer access unit. As described above, multi-layer extensions enable a video presentation to include a base layer and one or more additional enhancement layers. It should be noted that in ITU-T H.265 a temporal true subset of a scalable layer is not referred to as a layer but referred to as a sub-layer or temporal sub-layer.

Figure 3:
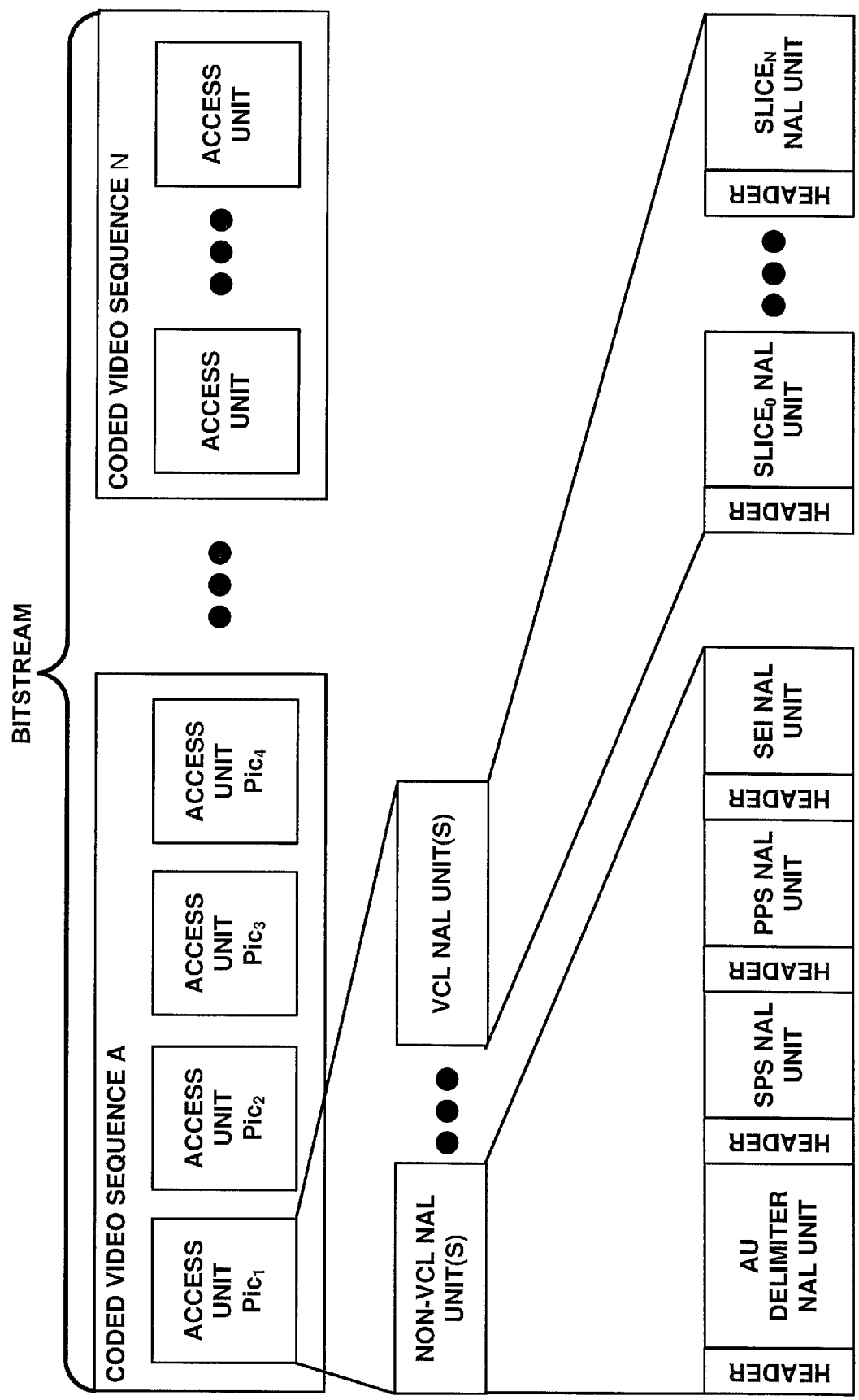
FIG. 3 is a conceptual diagram illustrating a data structure encapsulating coded video data and corresponding metadata according to one or more techniques of this this disclosure.

FIG. 3 illustrates an example of a bitstream including multiple CVSs, where a CVS is represented by NAL units included in a respective access unit. In the example illustrated in FIG. 3, non-VCL NAL units include respective parameter set NAL units (i.e., Sequence Parameter Sets (SPS), and Picture Parameter Set (PPS) NAL units), an SEI message NAL unit, and an access unit delimiter NAL unit. It should be noted that in FIG. 3, HEADER is a NAL unit header. JVET-O2001 defines NAL unit header semantics that specify the type of Raw Byte Sequence Payload (RBSP) data structure included in the NAL unit.

As described above, previously decoded pictures may be organized into one or more reference pictures lists and identified using a reference picture index value. JVET-O2001 includes a ref_pic_list_struct( ) syntax structure for signaling a reference picture list. A ref_pic_list_struct( ) syntax structure may be present in a Sequence Parameter Set (SPS) or a slice header. Table 1B illustrates the relevant portion of the syntax structure of the SPS provided in JVET-O2001 including the ref_pic_list_struct( ) syntax structure.

TABLE 1B

| | Descriptor |
|---|---|
| seq_parameter_set_rbsp( ) { | |
| ... | |
|   sps_video_parameter_set_id | u(4) |
|   sps_max_sub_layers_minus1 | u(3) |
| ... | |
|   long_term_ref_pics_flag | u(1) |
|   inter_layer_ref_pics_present_flag | u(1) |
|   sps_idr_rpl_present_flag | u(1) |
|   rpl1_same_as_rpl0_flag | u(1) |
|   for( i = 0; i < !rpl1_same_as_rpl0_flag ? 2 : 1; i++ ) { | |
|     num_ref_pic_lists_in_sps[ i ] | ue(v) |
|     for( j = 0; j < num_ref_pic_lists_in_sps[ i ]; j++) | |
|       ref_pic_list_struct( i, j ) | |
|   } | |
| ... | |
| } | |

With respect to Table 1B, JVET-O2001 provides the following semantics:

sps_video_parameter_set_id, when greater than 0, specifies the value of vps_video_parameter_set_id for the VPS referred to by the SPS. When sps_video_parameter_set_id is equal to 0, the SPS does not refer to a VPS and no VPS is referred to when decoding each CVS referring to the SPS.

sps_max_sub_layers_minus1 plus 1 specifies the maximum number of temporal sub-layers that may be present in each CVS referring to the SPS. The value of sps_max_sub_layers_minus1 shall be in the range of 0 to 6, inclusive.

long_term_ref-pics_flag equal to 0 specifies that no LTRP (long term reference picture) is used for inter prediction of any coded picture in the CVS. long_term_ref_pics_flag equal to 1 specifies that LTRPs may be used for inter prediction of one or more coded pictures in the CVS.

inter_layer_ref_pics_present_flag equal to 0 specifies that no ILRP (inter layer reference picture) is used for inter prediction of any coded picture in the CVS. inter_layer_ref_pics_flag equal to 1 specifies that ILRPs may be used for inter prediction of one or more coded pictures in the CVS. When sps_video_parameter_set_id is equal to 0, the value of inter_layer_ref_pics_present_flag is inferred to be equal to 0.

sps_idr_rpl_present_flag equal to 1 specifies that reference picture list syntax elements are present in slice headers of IDR (instanteouse decoding refresh) pictures. sps_idr_rpl_present_flag equal to 0 specifies that reference picture list syntax elements are not present in slice headers of IDR pictures.

rpl1_same_as_rpl0_flag equal to 1 specifies that the syntax structures num_ref_pic_lists_in_sps[1] and ref pic_list_struct(1, rplsIdx) are not present and the following applies:
  The value of num_ref_pic_lists_insps[1] is inferred to be equal to the value of num_ref_pic_lists_insps[0].
  The value of each of syntax elements in ref pic_list_struct(1, rplsIdx) is inferred to be equal to the value of corresponding syntax element in ref_pic_list_struct(0, rplsIdx) for rplsIdx ranging from 0 to num_ref_pic_lists_insps[0].

num_ref_pic_lists_in_sps[1] specifies the number of the ref_pic_list_struct(listIdx, rplsIdx) syntax structures with listIdx equal to i included in the SPS. The value of num_ref_pic_lists_in_sps[i] shall be in the range of 0 to 64, inclusive.

NOTE—For each value of listIdx (equal to 0 or 1), a decoder should allocate memory for a total number of num_ref_pic_lists_insps[i]+1 ref_pic_list_struct(listIdx, rplsIdx) syntax structures since there may be one ref_pic_list_struct(listIdx, rplsIdx) syntax structure directly signalled in the slice headers of a current picture.

Table 2 illustrates the syntax of the ref_pic_list_struct( ) as provided in JVET-O2001.

TABLE 2

| | Descriptor |
|---|---|
| ref_pic_list_struct( listIdx, rplsIdx ) { | |
|   num_ref_entries[ listIdx ][ rplsIdx ] | ue(v) |
|   if( long_term_ref_pics_flag ) | |
|     ltrp_in_slice_header_flag[ listIdx ][ rplsIdx ] | u(1) |
|   for( i = 0, j = 0; i < num_ref_entries[ listIdx ][ rplsIdx ]; i++) { | |
|     if( inter_layer_ref_pics_present_flag ) | |
|       inter_layer_ref_pic_flag[ listIdx ][ rplsIdx ][ i ] | u(1) |
|     if( !inter_layer_ref_pics_flag[ listIdx ][ rplsIdx ][ i ] ) | |
|     { | |
|       if( long_term_ref_pics_flag ) | |
|         st_ref_pic_flag[ listIdx ][ rplsIdx ][ i ] | u(1) |
|       if( st_ref_pic_flag[ listIdx ][ rplsIdx ][ i ] ) { | |
|         abs_delta_poc_st[ listIdx ][ rplsIdx ][ i ] | ue(v) |
|         if( AbsDeltaPocSt[ listIdx ][ rplsIdx ][ i ] > 0 ) | |
|           strp_entry_sign_flag[ listIdx ][ rplsIdx ][ i ] | u(1) |
|       } else if( !ltrp_in_slice_header_flag[ listIdx ][ rplsIdx ] ) | |
|         rpls_poc_lsb_lt[ listIdx ][ rplsIdx ][ j++ ] | u(v) |
|     } else | |
|       ilrp_idc[ listIdx ][ rplsIdx ][ i ] | ue(v) |
|   } | |
| } | |

With respect to Table 2, JVET-O2001 provides the following semantics:

The ref pic_list_struct(listIdx, rplsIdx) syntax structure may be present in an SPS or in a slice header. Depending on whether the syntax structure is included in a slice header or an SPS, the following applies:
  If present in a slice header, the ref_pic_list_struct (listIdx, rplsIdx) syntax structure specifies reference picture list listIdx of the current picture (the picture containing the slice).

Otherwise (present in an SPS), the ref_pic_list_struct (listIdx, rplsIdx) syntax structure specifies a candidate for reference picture list listIdx, and the term "the current picture" in the semantics specified in the remainder of this clause refers to each picture that 1) has one or more slices containing ref_pic_list_idx [listIdx] equal to an index into the list of the ref_pic_list_struct(listIdx, rplsIdx) syntax structures included in the SPS, and 2) is in a CVS that refers to the SPS.

num_ref_entries[listIdx][rplsIdx] specifies the number of entries in the ref pic_list_struct(listIdx, rplsIdx) syntax structure. The value of num_ref_entries[listIdx][rplsIdx] shall be in the range of 0 to sps_max_dec_pic_buffering_minus1+14, inclusive.

ltrp_in_slice_header_flag[listIdx][rplsIdx] equal to 0 specifies that the POC LSBs of the LTRP entries in the ref pic_list_struct(listIdx, rplsIdx) syntax structure are present in the ref_pic_list_struct(listIdx, rplsIdx) syntax structure. ltrp_in_slice_header_flag[listIdx][rplsIdx] equal to 1 specifies that the POC LSBs of the LTRP entries in the ref pic_list_struct(listIdx, rplsIdx) syntax structure are not present in the ref pic_list_struct (listIdx, rplsIdx) syntax structure.

inter_layer_ref_pic_flag[listIdx][rplsIdx][i] equal to 1 specifies that the i-th entry in the ref pic_list_struct (listIdx, rplsIdx) syntax structure is an ILRP entry. inter_layer_ref_pic_flag[listIdx][rplsIdx][i] equal to 0 specifies that the i-th entry in the ref pic_list_struct (listIdx, rplsIdx) syntax structure is not an ILRP entry. When not present, the value of inter_layer_ref_pic_flag [listIdx][rplsIdx][i] is inferred to be equal to 0.

st_ref_pic_flag[listIdx][rplsIdx][i] equal to 1 specifies that the i-th entry in the ref pic_list_struct(listIdx, rplsIdx) syntax structure is an STRP entry. st_ref_pic_flag[listIdx][rplsIdx][i] equal to 0 specifies that the i-th entry in the ref_pic_list_struct(listIdx, rplsIdx) syntax structure is an LTRP entry. When inter_layer_ref_pic_flag[listIdx][rplsIdx][i] is equal to 0 and st_ref_pic_flag [listIdx][rplsIdx][i] is not present, the value of st_ref_pic_flag[listIdx][rplsIdx][i] is inferred to be equal to 1.

The variable NumLtrpEntries[listIdx][rplsIdx] is derived as follows:

```
for( i =0, NumLtrpEntries[ listIdx ][ rplsIdx ] = 0; i <
num_ref entries[ listIdx ][ rplsIdx ]; i++ )
    if( !inter_layer_ref_pic_flag[ listIdx ][ rplsIdx ][ i ] && !st_ref_pie_flag
[ listIdx ][ rplsIdx ][ i ] )
        NumLtrpEntries[ listIdx ][ rplsIdx ]++
``` abs_delta_poc_st[listIdx][rplsIdx][i] specifies the value of the variable AbsDeltaPocSt[listIdx][rplsIdx][i] as follows:

```
if( sps_weighted_pred_flag | | sps_weighted_bipred_flag )
    AbsDeltaPocSt[ listIdx ][ rplsIdx ][ i ] = abs_delta_poc_st[ listIdx ]
[ rplsIdx ][ i ]
else
    AbsDeltaPoeSt[ listIdx ][ rplsIdx ][ i ] = abs_delta_poc_st[ listIdx ]
[ rplsIdx ][ i ] + 1
```

The value of abs_delta_poc_st[listIdx][rplsIdx][i] shall be in the range of 0 to $2^{15}-1$, inclusive.

strp_entry_sign_flag[listIdx][rplsIdx][i] equal to 1 specifies that i-th entry in the syntax structure ref_pic_list_struct(listIdx, rplsIdx) has a value greater than or equal to 0. strp_entry_sign_flag[listIdx][rplsIdx][i] equal to 0 specifies that the i-th entry in the syntax structure ref_pic_list_struct(listIdx, rplsIdx) has a value less than 0. When not present, the value of strp_entry_sign_flag [listIdx][rplsIdx][i] is inferred to be equal to 1.

The list DeltaPocValSt[listIdx][rplsIdx] is derived as follows:

```
for( i = 0; i < num_ref entries[ listIdx ][ rplsIdx ]; i++ )
    if( !inter_layer_ref_pic_flag[ listIdx ][ rplsIdx ][ i ] && st_ref_pic_flag
[ listIdx ][ rplsIdx ][i ] )
        DeltaPocValSt[ listIdx ][ rplsIdx ][ i ] =
( strp_entry_sign_flag[ listIdx ][ rplsIdx ][ i ] ) ?
        AbsDeltaPocSt[ listIdx ][ rplsIdx ][ i ] : 0 −
AbsDeltaPocSt[ listIdx ][ rplsIdx ][ i ]
``` rpls_poc_lsb_lt[listIdx][rplsIdx][i] specifies the value of the picture order count modulo MaxPicOrderCntLsb of the picture referred to by the i-th entry in the ref_pic_list_struct(listIdx, rplsIdx) syntax structure. The length of the rpls_poc_lsb_lt[listIdx][rplsIdx][i] syntax element is log2_maxpic_order_cnt_lsb_minus4+4 bits.

ilrp_idc[listIdx][rplsIdx][i] specifies the index, to the list of directly dependent layers, of the ILRP of i-th entry in ref_pic_list_struct(listIdx, rplsIdx) syntax structure to the list of directly dependent layers. The value of ilrp_idc[listIdx][rplsIdx][i] shall be in the range of 0 to the GeneralLayerIdx[nuh_layer_id]−1, inclusive.

With respect to Tables 1A-1B and Table 2, it should be noted that JVET-O2001 provides the following definitions:

clean random access (CRA) picture: An IRAP picture for which each VCL NAL unit has nal_unit_type equal to CRA_NUT.

NOTE—A CRA picture does not refer to any pictures other than itself for inter prediction in its decoding process, and may be the first picture in the bitstream in decoding order, or may appear later in the bitstream. A CRA picture may have associated RADL or RASL pictures. When a CRA picture has NoIncorrectPicOutputFlag equal to 1, the associated RASL pictures are not output by the decoder, because they may not be decodable, as they may contain references to pictures that are not present in the bitstream.

coded layer video sequence start (CLVSS) picture: A coded picture that is an IRAP picture with NoIncorrectPicOutputFlag equal to 1 or a GDR picture with NoIncorrectPicOutputFlag equal to 1.

gradual decoding refresh (GDR) picture: A picture for which each VCL NAL unit has nal_unit_type equal to GDR_NUT.

instantaneous decoding refresh (IDR) picture: An IRAP picture for which each VCL NAL unit has nal_unit_type equal to IDR_W_RADL or IDR_N_LP.

NOTE—An IDR picture does not refer to any pictures other than itself for inter prediction in its decoding process, and may be the first picture in the bitstream in decoding order, or may appear later in the bitstream. Each IDR picture is the first picture of a CVS in decoding order. When an DR picture for which each VCL NAL unit has nal_unit_type equal to IDR_W_RADL, it may have associated RADL pictures. When an IDR picture for which each VCL NAL unit has nal_unit_type equal to IDR_N_LP, it does not have any associated leading pictures. An IDR picture does not have associated RASL pictures.

inter-layer reference picture (ILRP): A picture in the same access unit with the current picture, with nuh_layer_id less than the nuh_layer_id of the current picture, and is marked as "used for long-term reference".

intra random access point (IRAP) picture: A coded picture for which each VCL NAL unit has nal_unit_type in the range of IDR_W_RADL to CRA_NUT, inclusive.

NOTE—An IRAP picture does not refer to any pictures other than itself for inter prediction in its decoding process, and may be a CRA picture or an IDE picture. The first picture in the bitstream in decoding order must be an IRAP or GDR picture. Provided the necessary parameter sets are available when they need to be referred, the IRAP picture and all subsequent non-RASL pictures in the CVS in decoding order can be correctly decoded without performing the decoding process of any pictures that precede the IRAP picture in decoding order.

leading picture: A picture that that is in the same layer as the associated IRAP picture and precedes the associated IRAP picture in output order.

long-term reference picture (LTRP): A picture that is marked as "used for long-term reference".

random access decodable leading (RADL) picture: A coded picture for which each VCL NAL unit has nal_unit_type equal to RADL_NUT.

NOTE—All RADL pictures are leading pictures. RADL pictures are not used as reference pictures for the decoding process of trailing pictures of the same associated IRAP picture. When present, all RADL pictures precede, in decoding order, all trailing pictures of the same associated IRAP picture.

random access skipped leading (RASL) picture: A coded picture for which each VCL NAL unit has nal_unit_type equal to RASL_NUT.

NOTE—All RASL pictures are leading pictures of an associated CRA picture. When the associated CRA picture has NoIncorrectPicOutputFlag equal to 1, the RASL picture is not output and may not be correctly decodable, as the RASL picture may contain references to pictures that are not present in the bitstream. RASL pictures are not used as reference pictures for the decoding process of non-RASL pictures. When present, all RASL pictures precede, in decoding order, all trailing pictures of the same associated CRA picture.

short-term reference picture (STRP): A picture with nuh_layer_id equal to the nuh_layer_id of the current picture and that is marked as "used for short-term reference".

step-wise temporal sub-layer access (STSA) picture: A coded picture for which each VCL NAL unit has nal_unit_type equal to STSA_NUT.

NOTE—An STSA picture does not use pictures with the same TemporalId as the STSA picture for inter prediction reference. Pictures following an STSA picture in decoding order with the same TemporalId as the STSA picture do not use pictures prior to the STSA picture in decoding order with the same TemporalId as the STSA picture for inter prediction reference. An STSA picture enables up-switching, at the STSA picture, to the sub-layer containing the STSA picture, from the immediately lower sub-layer. STSA pictures must have TemporalId greater than 0.

As provided above, ref_pic_list_struct( ) syntax structure may be included in a slice header. Table 3 illustrates the relevant portion of the syntax structure of the PPS provided in JVET-O2001 with respect to a ref_pic_list_struct( ) syntax structure.

TABLE 3

| | Descriptor |
|---|---|
| pic_parameter_set_rbsp( ) { | |
| ... | |
| for( i = 0; i < 2; i++ ) | |
| num_ref_idx_default_active_minus1[ i ] | ue(v) |
| rpl1_idx_present_flag | u(1) |
| ... | |
| constant_slice_header_params_enabled_flag | u(1) |
| if( constant_slice_header_params_enabled_flag ) { | |
| ... | |
| for( i = 0; i < 2; i++ ) | |
| pps_ref_pic_list_sps_idc[ i ] | u(2) |
| ... | |
| } | |
| } | |

With respect to Table 3, JVET-O2001 provides the following semantics:

num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_active_minus1[i] shall be in the range of 0 to 14, inclusive.

rpl1_idx_present_flag equal to 0 specifies that ref_pic_list_sps_flag[1] and ref_pic_list_idx[1] are not present in slice headers. rpl1_idx_present_flag equal to 1 specifies that ref_pic_list_sps_flag[1] and ref_pic_list_idx[1] may be present in slice headers.

constant_slice_header_params_enabled_flag equal to 0 specifies that pps_dep_quant_enabled_idc, pps_ref_pic_list_sps_idc[i], pps_temporal_mvp_enabled_idc, pps_mvd_l1_zero_idc, pps_collocated_from_l0_idc, pps_six_minus_max_num_merge_cand_plus1, pps_five_minus_max_num_subblock_merge_cand_plus1, and pps_max_num_merge_cand_minus_max_num_triangle_cand_minus1 are inferred to be equal to 0. constant_slice_header_params_enabled_flag equal to 1 specifies that these syntax elements are present in the PPS.

pps_ref_pic_list_sps_idc[i] equal to 0 specifies that the syntax element ref_pic_list_sps_flag[i] is present in slice header of slices referring to the PPS. pps_ref_pic_list_sps_idc[i] equal to 1 or 2 specifies that the syntax element ref_pic_list_sps_flag[i] is not present in slice header of slices referring to the PPS. pps ref_pic list sps idc[i] equal to 3 is reserved for future use by ITU-T I ISO/IEC.

Table 4 illustrates the relevant portion of the syntax structure of the slice header provided in JVET-O2001 including the ref_pic_list_struct( ) syntax structure.

TABLE 4

| | Descriptor |
|---|---|
| slice_header( ) {<br>...<br>  slice_type<br>...<br>  slice_pic_order_cnt_lsb<br>...<br>  if( ( nal_unit_type != IDR_W_RADL && nal_unit_type != IDR_N_LP ) \|\|<br>    sps_idr_rpl_present_flag ) {<br>    for( i = 0; i < 2; i++ ) {<br>      if( num_ref_pic_lists_in_sps[ i ] > 0 && !pps_ref_pic_list_sps_idc[ i ] &&<br>        ( i == 0 \|\| ( i == 1 && rpl1_idx_present_flag ) ) )<br>        ref_pic_list_sps_flag[ i ]<br>      if( ref_pic_list_sps_flag[ i ] ) {<br>        if( num_ref_pic_lists_in_sps[ i ] > 1 &&<br>          ( i == 0 \|\| ( i == 1 && rpl1_idx_present_flag ) ) )<br>          ref_pic_list_idx[ i ]<br>      } else<br>        ref_pic_list_struct( i, num_ref_pic_lists_in _sps[ i ] )<br>      for( j = 0; j < NumLtrpEntries[ i ][ RplsIdx[ i ] ]; j++ ) {<br>        if( ltrp_in_slice_header_flag[ i ][ RplsIdx[ i ] ] )<br>          slice_poc_lsb_lt[ i ][ j ]<br>        delta_poc_msb_present_flag[ i ][ j ]<br>        if( delta_poc_msb_present_flag[ i ][ j ] )<br>          delta_poc_msb_cycle_lt[ i ][ j ]<br>      }<br>    }<br>    if( ( slice_type != 1 && num_ref_entries[ 0 ][ RplsIdx[ 0 ] ] > 1 ) \|\|<br>      ( slice_type == B && num_ref_entries[ 1 ][ RplsIdx[ 1 ] ] > 1 ) ) {<br>      num_ref_idx_active_override_flag<br>      if( num_ref_idx_active_override_flag )<br>        for( i = 0; i < ( slice_type == B ? 2: 1 ); i++ )<br>          if( num_ref_entries[ i ][ RplsIdx[ i ] ] > 1 )<br>            num_ref_idx_active_minus1[ i ]<br>    }<br>  }<br>...<br>} | <br><br>ue(v)<br><br>u(v)<br><br><br><br><br><br>u(1)<br><br><br><br><br>u(v)<br><br><br><br><br>u(v)<br>u(1)<br><br>ue(v)<br><br><br><br><br><br>u(1)<br><br><br><br><br>ue(v)<br><br><br><br> |

JVET-O2001 provides the following definitions for the respective syntax elements illustrated in Table 4.

slice_type specifies the coding type of the slice according to Table 5.

TABLE 5

| slice_type | Name of slice_type |
|---|---|
| 0 | B (B slice) |
| 1 | P (P slice) |
| 2 | I (I slice) |

When nal_unit_type is a value of nal_unit_type in the range of IDR_W_RADL to CRA_NUT, inclusive, and the current picture is the first picture in an access unit, slice_type shall be equal to 2.

slice_pic_order_cnt_lsb specifies the picture order count modulo MaxPicOrderCntLsb for the current picture. The length of the slice_pic_order_cnt_lsb syntax element is log2_max_pic_order_cnt_lsb_minus4+4 bits. The value of the slice_pic_order_cnt_lsb shall be in the range of 0 to MaxPicOrderCntLsb−1, inclusive.

ref_pic_list_sps_flag[i] equal to 1 specifies that reference picture list i of the current slice is derived based on one of the ref_pic_list_struct(listIdx, rplsIdx) syntax structures with listIdx equal to i in the SPS. ref_pic_list_sps_flag[i] equal to 0 specifies that reference picture list i of the current slice is derived based on the ref_pic_list_struct(listIdx, rplsIdx) syntax structure with listIdx equal to i that is directly included in the slice headers of the current picture.

When ref_pic_list_sps_flag[i] is not present, the following applies:
If num_ref_pic_lists_insps[i] is equal to 0, the value of ref_pic_list_sps_flag[i] is inferred to be equal to 0.
Otherwise (num_ref_pic_lists_in_sps[i] is greater than 0), if rpl1_idx_present_flag is equal to 0, the value of ref_pic_list_sps_flag[1] is inferred to be equal to ref_pic_list_sps_flag[0].
Otherwise, the value of ref_pic_list_sps_flag[i] is inferred to be equal to pps_ref_pic_list_sps_idc[i]−1.

ref_pic_list_idx[i] specifies the index, into the list of the ref_pic_list_struct(listIdx, rplsIdx) syntax structures with listIdx equal to i included in the SPS, of the ref_pic_list_struct(listIdx, rplsIdx) syntax structure with listIdx equal to i that is used for derivation of reference picture list i of the current picture. The syntax element ref_pic_list_idx[i] is represented by Ceil(Log2 (num_ref_pic_lists_in_sps[i])) bits. When not present, the value of ref_pic_list_idx[i] is inferred to be equal to 0. The value of ref_pic_list_idx[i] shall be in the range of 0 to num_ref_pic_lists_in_sps[i]−1, inclusive. When ref_pic_list_sps_flag[i] is equal to 1 and num_ref_pic_lists_in_sps[i] is equal to 1, the value of ref_pic_list_idx[i] is inferred to be equal to 0. When ref_pic_list_sps_flag[i] is equal to 1 and rpl1_idx_present_flag is equal to 0, the value of ref_pic_list_idx[1] is inferred to be equal to ref_pic_list_idx[0].

The variable RplsIdx[i] is derived as follows:
RplsIdx[i]=ref_pic_list_sps_flag[i]? ref_pic_list_idx[i]:
num_ref_pic_lists_in_sps[i]

slice_poc_lsb_lt[i][i] specifies the value of the picture order count modulo MaxPicOrderCntLsb of the j-th LTRP entry in the i-th reference picture list. The length of the slice_poc_lsb_lt[i][j] syntax element is log2_max_pic_order_cnt_lsb_minus4+4 bits. The variable PocLsbLt[i][j] is derived as follows:
PocLsbLt[i][j]=ltrp_in_slice_header_flag[i][RplsIdx [i]]? slice_poc_lsb_lt[i][j]: rpls_poc_lsb_lt[listIdx] [RplsIdx[i]][j]

delta_poc_msb_present_flag[i j] equal to 1 specifies that delta_poc_msb_cycle_lt[i][ ] is present. delta_poc_msb_present_flag[i][j] equal to 0 specifies that delta_poc_msb_cycle_lt[i][j] is not present.

Let prevTid0Pic be the previous picture in decoding order that has nuh_layer_id the same as the current picture, has TemporalId equal to 0, and is not a RASL or RADL picture. Let setOfPrevPocVals be a set consisting of the following:

the PicOrderCntVal of prevTid0Pic, the PicOrderCntVal of each picture that is referred to by entries in RefPicList[0] or RefPicList[1] of prevTid0Pic and has nuh_layer_id the same as the current picture, the PicOrderCntVal of each picture that follows prevTid0Pic in decoding order, has nuh_layer_id the same as the current picture, and precedes the current picture in decoding order.

When there is more than one value in setOfPrevPocVals for which the value modulo MaxPicOrderCntLsb is equal to PocLsbLt[i][j], the value of delta_poc_msb_present_flag[i] [j] shall be equal to 1.

delta_poc_msb_cycle_lt[i][j] specifies the value of the variable FullPocLt[i][j] as follows:

```
if( j = = 0 )
  DeltaPocMsbCycleLt[ i ][ j ] = delta_poc_msb_cycle_lt[ i ][ j ]
else
  DeltaPocMsbCycleLt[ i ][ j ] = delta_poc_msb_cycle_lt[ i ][ j ] +
DeltaPocMsbCycleLt[ i ][ j − 1 ]
FullPocLt[ i ][ j ] = PicOrderCntVal − DeltaPocMsbCycleLt[ i ][ j ] *
MaxPicOrderCntLsb −
    ( PicOrderCntVal & ( MaxPicOrderCntLsb − 1 ) ) + PocLsbLt[ i ][ j
]
```

The value of delta_poc_msb_cycle_lt[i][ j] shall be in the range of 0 to $2^{(32-log2\_max\_pic\_order\_cnt\_lsb\_minus4-4)}$, inclusive. When not present, the value of delta_poc_msb_cycle_lt[i][j] is inferred to be equal to 0.

num_ref_idx_active_override_flag equal to 1 specifies that the syntax element num_ref_idx_active_minus1[0] is present for P and B slices and that the syntax element num_ref_idx_active_minus1[1] is present for B slices. num_ref_idx_active_override_flag equal to 0 specifies that the syntax elements num_ref_idx_active_minus1 [0] and num_ref_idx_active_minus1[1] are not present. When not present, the value of num_ref_idx_active_override_flag is inferred to be equal to 1.

num_ref_idx_active_minus1[i] is used for the derivation of the variable NumRefIdxActive[i] as specified by the Equation below. The value of num_ref_idx_active_minus1[i] shall be in the range of 0 to 14, inclusive.

For i equal to 0 or 1, when the current slice is a B slice, num_ref_idx_active_override_flag is equal to 1, and num_ref_idx_active_minus1[i] is not present, num_ref_idx_active_minus1[i] is inferred to be equal to 0.

When the current slice is a P slice, num_ref_idx_active_override_flag is equal to 1, and num_ref_idx_active_minus1[0] is not present, num_ref_idx_active_minus1[0] is inferred to be equal to 0.

The variable NumRefIdxActive[i] is derived as follows:

```
for( i = 0; i < 2; i++) {
  if( slice_type = = B | | ( slice_type = = P && i = = 0 ) ) {
    if( num_ref_idx_active_override_flag )
      NumRefIdxActive[ i ] = num_ref_idx_active_minus1 [ i ] + 1
    else {
      if( num_ref_entries[ i ][ RplsIdx[ i ] ] >=
num_ref_idx_default_active_minus1[ i ] + 1 )
        NumRefIdxActive[ i ] = num_ref_idx_default_active_minus1[ i ]
+ 1
      else
        NumRefIdxActive[ i ] = num_ref_entries[ i ][RplsIdx[ i ] ]
    }
  } else // slice type = = I | | ( slice_type = = P && i = = 1 )
    NumRefIdxActive[ i ] = 0
}
```

The value of NumRefIdxActive[i]−1 specifies the maximum reference index for reference picture list i that may be used to decode the slice. When the value of NumRefIdxActive[i] is equal to 0, no reference index for reference picture list i may be used to decode the slice. When the current slice is a P slice, the value of NumRefIdxActive[0] shall be greater than 0.

When the current slice is a B slice, both NumRefIdxActive[0] and NumRefIdxActive[1] shall be greater than 0.

JVET-O2001 provides the following decoding process for a picture order count of a current picture:

Output of this process is PicOrderCntVal, the picture order count of the current picture. Each coded picture is associated with a picture order count variable, denoted as PicOrderCntVal.

When the current picture is not a CLVSS picture, the variables prevPicOrderCntLsb and prevPicOrderCntMsb are derived as follows:

Let prevTid0Pic be the previous picture in decoding order that has nuh_layer_id equal to the nuh_layer_id of the current picture and TemporalId equal to 0 and that is not a RASL or RADL picture.

The variable prevPicOrderCntLsb is set equal to slice_pic_order_cnt_lsb of prevTid0Pic.

The variable prevPicOrderCntMsb is set equal to PicOrderCntMsb of prevTid0Pic.

The variable PicOrderCntMsb of the current picture is derived as follows:

If the current picture is a CLVSS picture, PicOrderCntMsb is set equal to 0.

Otherwise, PicOrderCntMsb is derived as follows:

```
if( ( slice_pic_order_cnt_lsb < prevPicOrderCntLsb ) &&
    ( ( prevPicOrderCntLsb − slice_pic_order_cnt_lsb ) >=
( MaxPicOrderCntLsb / 2 ) ) )
  PicOrderCntMsb = prevPicOrderCntMsb + MaxPicOrderCntLsb
else if( (slice_pic_order_cnt_lsb > prevPicOrderCntLsb ) &&
    ( ( slice_pic_order_cnt_lsb − prevPicOrderCntLsb ) >
( MaxPicOrderCntLsb / 2 ) ) )
  PicOrderCntMsb = prevPicOrderCntMsb − MaxPicOrderCntLsb
else
  PicOrderCntMsb = prevPicOrderCntMsb
```

PicOrderCntVal is derived as follows:
PicOrderCntVal=PicOrderCntMsb slice_pic_order_cnt_lsb NOTE—All CLVSS pictures will have PicOrderCntVal equal to slice_pic_order_cnt_lsb since for CLVSS pictures PicOrderCntMsb is set equal to 0.

The value of PicOrderCntVal shall be in the range of $-2^{31}$ to $2^{31}-1$, inclusive.

In one CVS, the PicOrderCntVal values for any two coded pictures with the same value of nuh_layer_id shall not be the same.

All pictures in any particular access unit shall have the same value of PicOrderCntVal. The function PicOrderCnt(picX) is specified as follows:

PicOrderCnt(pic$X$)=PicOrderCntVal of the picture pic$X$

The function DiffPicOrderCnt(picA, picB) is specified as follows:

DiffPicOrderCnt(pic$A$,pic$B$)=PicOrderCnt(pic$A$)−PicOrderCnt(pic$B$)

The bitstream shall not contain data that result in values of DiffPicOrderCnt(picA, picB) used in the decoding process that are not in the range of $-2^{15}$ to $2^{15}-1$, inclusive.

NOTE—Let X be the current picture and Y and Z be two other pictures in the same CVS, Y and Z are considered to be in the same output order direction from X when both DiffPicOrderCnt(X, Y) and DiffPicOrderCnt(X, Z) are positive or both are negative.

Further, JVET-O2001, provides the following decoding process for reference picture list construction:

This process is invoked at the beginning of the decoding process for each slice of a non-IDR picture.

Reference pictures are addressed through reference indices. A reference index is an index into a reference picture list. When decoding an I slice, no reference picture list is used in decoding of the slice data. When decoding a P slice, only reference picture list 0 (i.e., RefPicList[0]), is used in decoding of the slice data. When decoding a B slice, both reference picture list 0 and reference picture list 1 (i.e., RefPicList[1]) are used in decoding of the slice data.

At the beginning of the decoding process for each slice of a non-IDR picture, the reference picture lists RefPicList[0] and RefPicList[1] are derived. The reference picture lists are used in marking of reference pictures as specified or in decoding of the slice data.

NOTE—For an I slice of a non-IDR picture that it is not the first slice of the picture, RefPicList[0] and RefPicList[1] may be derived for bitstream conformance checking purpose, but their derivation is not necessary for decoding of the current picture or pictures following the current picture in decoding order. For a P slice that it is not the first slice of a picture, RefPicList[1] may be derived for bitstream conformance checking purpose, but its derivation is not necessary for decoding of the current picture or pictures following the current picture in decoding order.

The reference picture lists RefPicList[0] and RefPicList[1] are constructed as follows:

```
for( i = 0; i < 2; i++ ) {
    for( j = 0, k = 0, pocBase = PicOrderCntVal; j < num_ref_entries[ i ][ RplsIdx[ i ] ]; j++)
    {
        if( !inter_layer_ref_pic_flag[ i ][ RplsIdx[ i ] ][ j ] ) {
            if( st_ref_picflag[ i ][ Rplsklx[ i ] ][ j ]) {
                RefPicPocList[ i ][ j ] = pocBase − DeltaPocValSt[ i ][ RplsIdx[ i ] ][ j ]
                if( there is a reference picture picA in the DPB with the same nuh_layer_id as
the current picture and PicOrderCntVal equal to RefPicPocList[ i ][ j ] )
                    RefPicList[ i ][ j ] = picA
                else
                    RefPicList[ i ][ j ] = "no reference picture"
            } else {
                if( !delta_poc_msb_cycle_lt[ i ][ k ] ) {
                    if( there is a reference picA in the DPB with the same nuh_layer_id as
the current picture and PicOrderCntVal & ( MaxPicOrderCntLsb − 1) equal to
PocLsbLt[ i ][ k ])
                        RefPicList[ i ][ j ] = picA
                    else
                        RefPicList[ i ][ j ] = "no reference picture"
                    RefPicLtPocList[ i ][ J ] = PocLsbLt[ i ][ k ]
                } else {
                    if( there is a reference picA in the DPB with the same nuh_layer_id as
the current picture and PicOrderCntVal equal to FullPocLt[ i ][ k ] )
                        RefPicList[ i ][ j ] = picA
                    else
                        RefPicList[i ][ j ] = "no reference picture"
                    RefPicLtPocList[ i ][ j ] = FullPocLt[ i ][ k ]
                }
                k++
            }
        } else {
            layerIdx =
DirectDependentLayerIdx[ GeneralLayerIdx[ nuh_layer_id ] ][ ilrp_idc[ i ][ RplsIdx
 ][ j ] ]
            refPicLayerId = vps_layer_id[ layerIdx ]
            if( there is a reference picture picA in the DPB with nuh_layer_id equal to
refPicLayerId and the same PicOrderCntVal as the current picture )
                RefPicList[ i ][ j ] = picA
            else
                RefPicList[ i ][ j ] = "no reference picture"
        }
    }
}
```

For each i equal to 0 or 1, the first NumRefIdxActive[i] entries in RefPicList[i] are referred to as the active entries in RefPicList[i], and the other entries in RefPicList[i] are referred to as the inactive entries in RefPicList[i].

NOTE—It is possible that a particular picture is referred to by both an entry in RefPicList[0] and an entry in RefPicList[1]. It is also possible that a particular picture is referred to by more than one entry in RefPicList[0] or by more than one entry in RefPicList[1].

NOTE—The active entries in RefPicList[0] and the active entries in RefPicList[1] collectively refer to all reference pictures that may be used for inter prediction of the current picture and one or more pictures that follow the current picture in decoding order. The inactive entries in RefPicList[0] and the inactive entries in RefPicList[1] collectively refer to all reference pictures that are not used for inter prediction of the current picture but may be used in inter prediction for one or more pictures that follow the current picture in decoding order.

NOTE—There may be one or more entries in RefPicList[0] or RefPicList[1] that are equal to "no reference picture" because the corresponding pictures are not present in the DPB. Each inactive entry in RefPicList[0] or RefPicList[0] that is equal to "no reference picture" should be ignored. An unintentional picture loss should be inferred for each active entry in RefPicList[0] or RefPicList[1] that is equal to "no reference picture".

It is a requirement of bitstream conformance that the following constraints apply:

For each i equal to 0 or 1, num_ref_entries[i][RplsIdx[i]] shall not be less than NumRefIdxActive[i].

The picture referred to by each active entry in RefPicList[0] or RefPicList[1] shall be present in the DPB and shall have TemporalId less than or equal to that of the current picture.

The picture referred to by each entry in RefPicList[0] or RefPicList[1] shall not be the current picture and shall have non_reference_picture_flag equal to 0.

An STRP entry in RefPicList[0] or RefPicList[1] of a slice of a picture and an LTRP entry in RefPicList[0] or RefPicList[1] of the same slice or a different slice of the same picture shall not refer to the same picture.

There shall be no LTRP entry in RefPicList[0] or RefPicList[1] for which the difference between the PicOrderCntVal of the current picture and the PicOrderCntVal of the picture referred to by the entry is greater than or equal to $2^{24}$.

Let setOfRefPics be the set of unique pictures referred to by all entries in RefPicList[0] that have the same nuh_layer_id as the current picture and all entries in RefPicList[1] that have the same nuh_layer_id as the current picture. The number of pictures in setOfRefPics shall be less than or equal to sps_max_dec_pic_buffering_minus1 and setOfRefPics shall be the same for all slices of a picture.

When the current picture is an STSA picture, there shall be no active entry in RefPicList[0] or RefPicList[1] that has TemporalId equal to that of the current picture.

When the current picture is a picture that follows, in decoding order, an STSA picture that has TemporalId equal to that of the current picture, there shall be no picture that has TemporalId equal to that of the current picture included as an active entry in RefPicList[0] or RefPicList[1] that precedes the STSA picture in decoding order.

The picture referred to by each ILRP entry in RefPicList[0] or RefPicList[1] of a slice of the current picture shall be in the same access unit as the current picture.

The picture referred to by each ILRP entry in RefPicList[0] or RefPicList[1] of a slice of the current picture shall be present in the DPB and shall have nuh_layer_id less than that of the current picture.

Each ILRP entry in RefPicList[0] or RefPicList[1] of a slice shall be an active entry.

JVET-O2001 further provides the following decoding process for generating unavailable reference pictures:

This process is invoked once per coded picture when the current picture is a CRA picture with NoIncorrectPicOutputFlag equal to 1 or a GDR picture with NoIncorrectPicOutputFlag equal to 1.

When this process is invoked, the following applies:

For each RefPicList[i][j], with i in the range of 0 to 1, inclusive, and j in the range of 0 to num_ref_entries[i][RplsIdx[i]]−1, inclusive, that is equal to "no reference picture", a picture is generated as specified below and the following applies:

The value of nuh_layer_id for the generated picture is set equal to nuh_layer_id of the current picture.

If st_ref_pic_flag[i][RplsIdx[i]][j] is equal to 1, the value of PicOrderCntVal for the generated picture is set equal to RefPicPocList[i][j] and the generated picture is marked as "used for short-term reference".

Otherwise (st_ref_pic_flag[i][RplsIdx[i]][j] is equal to 0), the value of PicOrderCntVal for the generated picture is set equal to RefPicLtPocList[i][j], the value of slice_pic_order_cnt_lsb for the generated picture is inferred to be equal to (RefPicLtPocList[i][j] & (MaxPicOrderCntLsb−1)), and the generated picture is marked as "used for long-term reference".

The value of PicOutputFlag for the generated reference picture is set equal to 0.

RefPicList[i][i] is set to be the generated reference picture.

Generation of One Unavailable Picture

When this process is invoked, an unavailable picture is generated as follows:

The value of each element in the sample array $S_L$ for the picture is set equal to 1<<(BitDepth$_Y$−1).

When ChromaArrayType is not equal to 0, the value of each element in the sample arrays $S_{Cb}$ and $S_{Cr}$ for the picture is set equal to 1<<(BitDepth$_C$−1).

The prediction mode CuPredMode[0][x][y] is set equal to MODE_INTRA for x ranging from 0 to pic_width_in_luma_samples−1, inclusive, and y ranging from 0 to pic_height_in_luma_samples−1, inclusive.

It is a requirement of bitstream conformance that the output of the recovery point picture following a GDR picture with NoIncorrectPicOutputFlag equal to 1 and the pictures following that recovery point picture in output order and decoding order is independent of the values set for the elements of $S_L$, $S_{Cb}$, $S_{Cr}$ and CuPredMode[0][x][y].

The reference picture list signaling provided in JVET-O2001 may be less than ideal. In particular, the signaling of inter layer reference pictures may be overly complex and inefficient. This disclosure describes techniques for efficiently signaling reference picture lists with respect to the signaling of inter layer reference pictures.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 4:
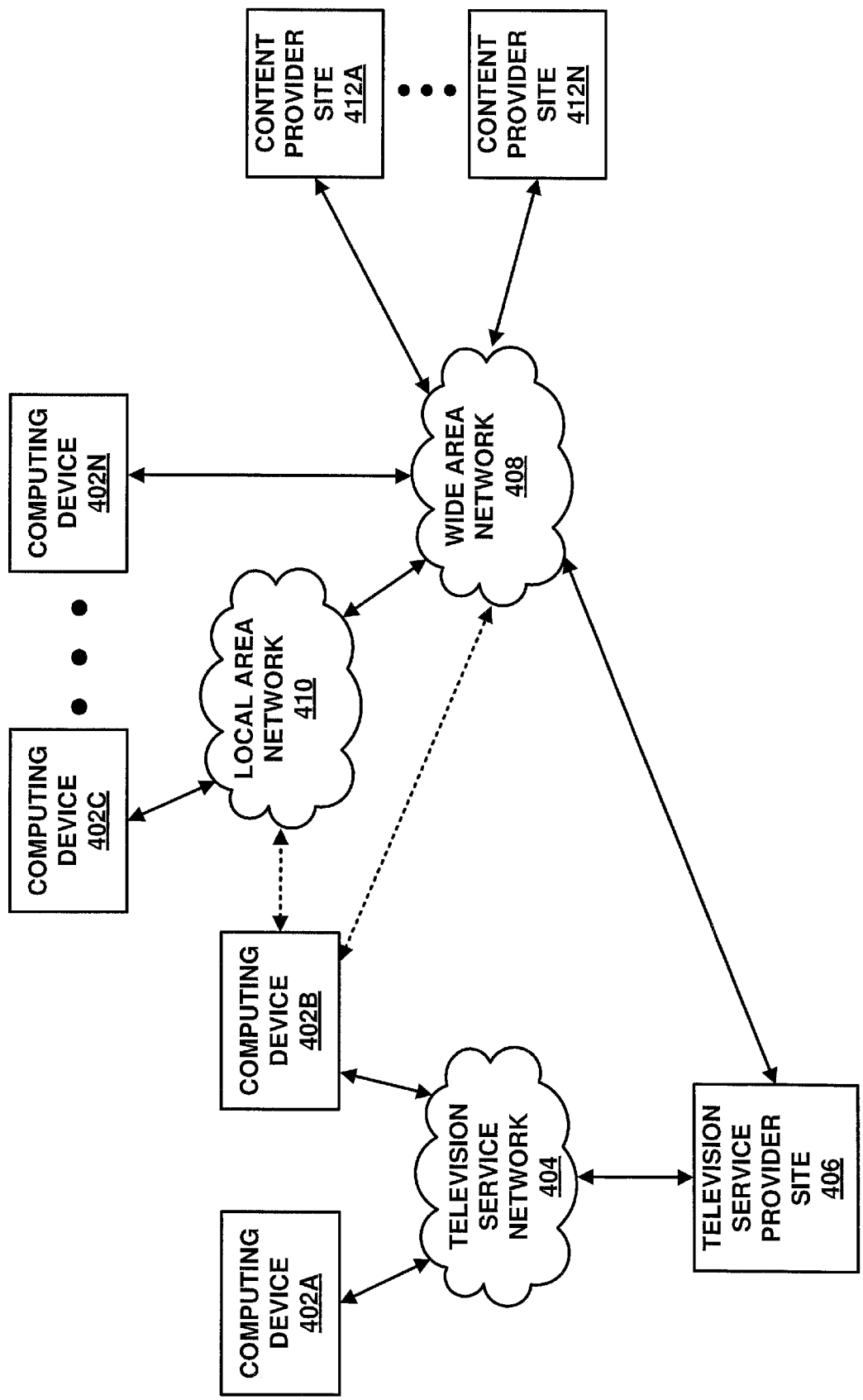
FIG. 4 is a conceptual drawing illustrating an example of components that may be included in an implementation of a system that may be configured to encode and decode video data according to one or more techniques of this this disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, $3^{rd}$ Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Figure 5:
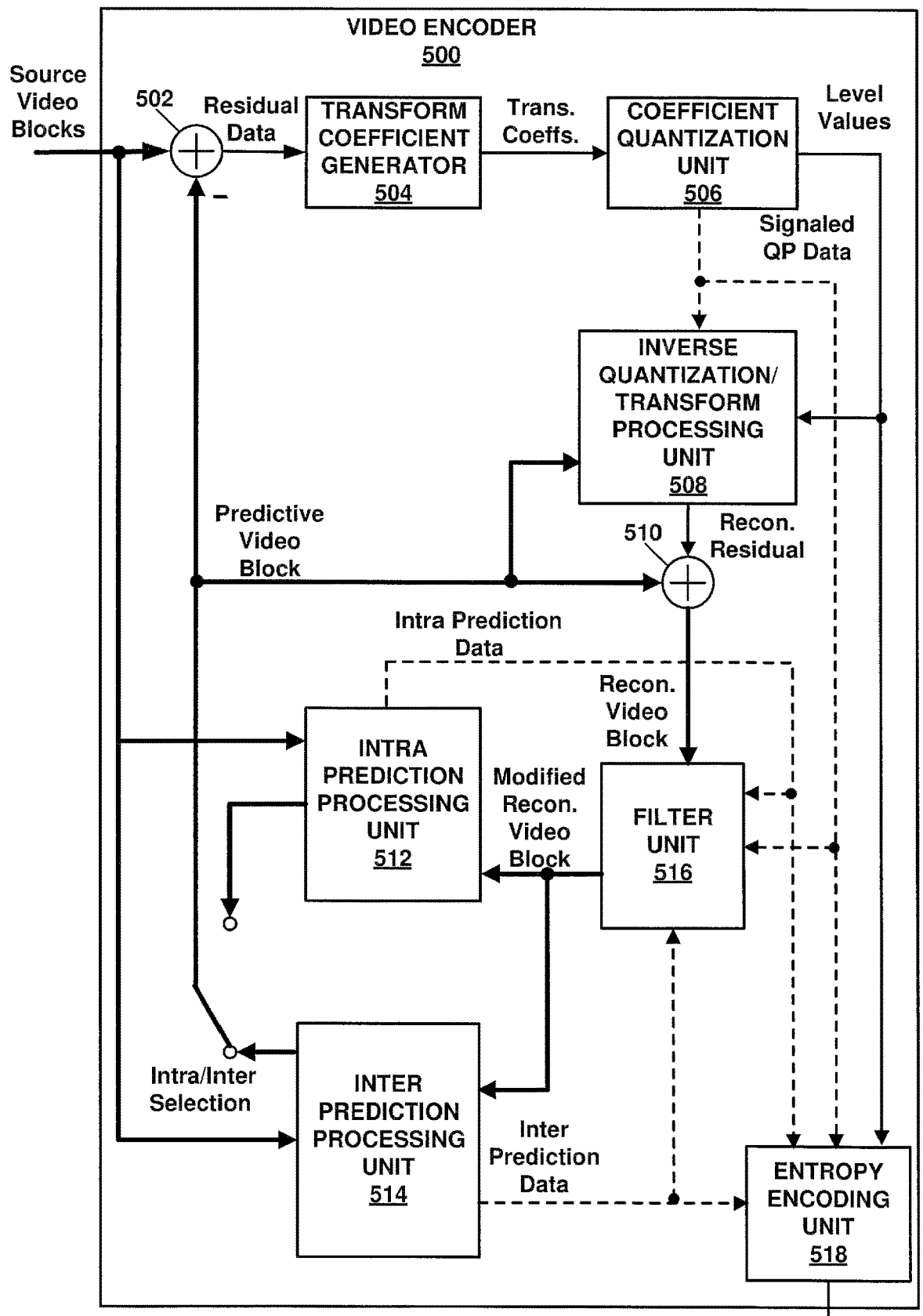
FIG. 5 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional sub-divisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including ap-proximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a predication mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a PU of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 518.

Referring again to FIG. 5, filter unit 516 receives reconstructed video blocks and coding parameters and outputs modified reconstructed video data. Filter unit 516 may be configured to perform deblocking and/or Sample Adaptive Offset (SAO) filtering. SAO filtering is a non-linear amplitude mapping that may be used to improve recon-struction by adding an offset to reconstructed video data. It should be noted that as illustrated in FIG. 5, intra prediction processing unit 512 and inter prediction processing unit 514 may receive modified reconstructed video block via filter unit 216. Entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclosure.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a ITU-T H.265 compliant bitstream forms a new ITU-T H.265 compliant bitstream by discarding and/or modifying data in the received bitstream. It should be noted that the term conforming bitstream may be used in place of the term compliant bitstream. In one example, data encapsulator 107 may be configured to generate syntax according to one or more techniques described herein. It should be noted that data encapsulator 107 need not necessary be located in the same physical device as video encoder 106. For example, functions described as being performed by video encoder 106 and data encapsulator 107 may be distributed among devices illustrated in FIG. 4.

As described above, the reference picture list signaling in JVET-O2001 may be less than ideal. In one example, according to the techniques herein, reference picture list signaling is provided that can save one bit in the most general case when inter layer reference pictures and long term reference pictures may be present. Further, in one example, according to the techniques herein, reference picture list signaling is provided that needs two syntax elements instead of three syntax elements as needed by JVET-O2001 to specify whether an entry is ILRP/LTRP/STRP with positive delta POC/STRP with negative delta POC. Thus, this signaling has a lower complexity.

Table 6 illustrates an example syntax of the ref_pic_list_struct( ) according to the techniques herein.

TABLE 6

| | Descriptor |
|---|---|
| ref_pic_list_struct( listIdx, rplsIdx ) { | |
|   num_ref_entries[ listIdx ][ rplsIdx ] | ue(v) |
|   if( long_term_ref_pics_flag ) | |
|     ltrp_in_slice_header_flag[ listIdx ][ rplsIdx ] | u(1) |
|   for( i = 0, j = 0; i < num_ref_entries[ listIdx ][ rplsIdx ]; i++) { | |
|     if(inter_layer_ref_pics present_flag \|\| long_term_ref_pics_flag) | |
|       ref_pic_idc_bitX[ listIdx ][ rplsIdx ][ i ] | u(1) |
|     if(ref_pic_idc_bitX[ listIdx ][ rplsIdx ][ i ] \|\| (!inter_layer_ref_pics_present_flag && !long_term_ref_pics_flag) \|\| (inter_layer_ref_pics_present_flag && long_term_ref_pics_flag)) | |
|       ref_pic_idc_bitY[ listIdx ][ rplsIdx ][ i ] | u(1) |
|     if( (RefPicIdc[ listIdx ][ rplsIdx ][ i ] == 00 \|\| RefPicIdc[ listIdx ][ rplsIdx ][ i ] == 01)) { | |
|       abs_delta_poc_st[ listIdx ][ rplsIdx ][ i ] | ue(v) |
|     } else if(RefPicIdc[ listIdx ][ rplsIdx ][ i ] == 11) && !ltrp_in_slice_header_flag[ listIdx ][ rplsIdx ] ) | |
|       rpls_poc_lsb_lt[ listIdx ][ rplsIdx ][ j++ ] | u(v) |
|     else if(RefPicIdc[ listIdx ][ rplsIdx ][ i ] == 10))) | |
|       ilrp_idc[ listIdx ][ rplsIdx ][ i ] | ue(v) |
|   } | |
| } | |

With respect to Table 6, in one example, the semantics may be based on the following:

The ref_pic_list_struct(listIdx, rplsIdx) syntax structure may be present in an SPS or in a slice header. Depending on whether the syntax structure is included in a slice header or an SPS, the following applies:

If present in a slice header, the ref_pic_list_struct (listIdx, rplsIdx) syntax structure specifies reference picture list listIdx of the current picture (the picture containing the slice).

Otherwise (present in an SPS), the ref_pic_list_struct (listIdx, rplsIdx) syntax structure specifies a candidate for reference picture list listIdx, and the term "the current picture" in the semantics specified in the remainder of this clause refers to each picture that 1) has one or more slices containing ref_pic_list_idx [listIdx] equal to an index into the list of the ref_pic_list_struct(listIdx, rplsIdx) syntax structures included in the SPS, and 2) is in a CVS that refers to the SPS.

num_ref_entries [listIdx][rplsIdx] specifies the number of entries in the ref_pic_list_struct(listIdx, rplsIdx) syntax structure. The value of num_ref_entries[listIdx][rplsIdx] shall be in the range of 0 to sps_max_dec_pic_buffering_minus1+14, inclusive.

ltrp_in_slice_header_flag[listIdx][rplsIdx] equal to 0 specifies that the POC LSBs of the LTRP entries in the ref_pic_list_struct(listIdx, rplsIdx) syntax structure are present in the ref_pic_list_struct(listIdx, rplsIdx) syntax structure. ltrp_in_slice_header_flag[listIdx][rplsIdx] equal to 1 specifies that the POC LSBs of the LTRP entries in the ref_pic_list_struct(listIdx, rplsIdx) syntax structure are not present in the ref_pic_list_struct(listIdx, rplsIdx) syntax structure.

ref_pic_idc_bitX[listIdx][rplsIdx][i] and ref_pic_idc_bitY[listIdx][rplsIdx][i] are used for the signaling of information about i-th entry in the reference picture list. When not present ref_pic_idc_bitX[listIdx][rplsIdx][i] is inferred to be equal to 0.

If inter_layer_ref_pics_present_flag and long_term_ref_pics_flag are both equal to 1 or are both equal to 0 following applies:

A 2-bit variable RefPicIdc[listIdx][rplsIdx][i] is derived as follows: RefPicIdc[listIdx][rplsIdx][i]=ref_pic_idc_bitX[listIdx][rplsIdx][i]<<1|ref_pic_idc_bitY[listIdx][rplsIdx][i]

RefPicIdc[listIdx][rplsIdx][i] equal to:

00 specifies that the i-th entry in the ref_pic_list_struct (listIdx, rplsIdx) syntax structure is an STRP entry and has a value greater than or equal to 0, 01 specifies that the i-th entry in the ref_pic_list_struct (listIdx, rplsIdx) syntax structure is an STRP entry and has a value less than 0, 10 specifies that the i-th entry in the ref_pic_list_struct (listIdx, rplsIdx) syntax structure is an ILRP entry, 11 specifies that the i-th entry in the ref_pic_list_struct (listIdx, rplsIdx) syntax structure is an LTRP entry.

Otherwise (i.e. when inter_layer_ref_pics_present_flag is equal to 1 and long_term_ref_pics_flag is equal to 0 or when inter_layer_ref_pics_present_flag is equal to 0 and long_term_ref_pics_flag is equal to 1)

ref_pic_idc_bitX[listIdx][rplsIdx][i] equal to 0 specifies that the i-th entry in the ref_pic_list_struct(listIdx, rplsIdx) syntax structure is:

an ILRP entry if inter_layer_ref_pics_present_flag is equal to 1 and RefPicIdc[listIdx][rplsIdx][i] is derived as 10 or is a LTRP entry if long_term_ref_pics_flag is equal to 1 and RefPicIdc[listIdx][rplsIdx][i] is derived as 11.

ref_pic_idc_bitX[listIdx][rplsIdx][i] equal to 1 specifies that:

if ref_pic_idc_bitY[listIdx][rplsIdx][i] is equal to 0 then the i-th entry in the ref_pic_list_struct(listIdx, rplsIdx) syntax structure is an STRP entry and has a value greater than or equal to 0, if ref_pic_idc_bitY[listIdx][rplsIdx][i] is equal to 1 then the i-th entry in the ref_pic_list_struct(listIdx, rplsIdx) syntax structure is an STRP entry and has a value less than 0.

The variable NumLtrpEntries[listIdx][rplsIdx] is derived as follows:

```
for( i = 0, NumLtrpEntries[ listIdx ][ rplsIdx ] = 0; i <
num_ref entries[ listIdx ][ rplsIdx ]; i++ )
  if(RefPicIdc[ listIdx ][ rplsIdx ][ i ] == 11 )
    NumLtrpEntries[ listIdx ][ rplsklx ]++
``` abs_delta_poc_st[listIdx][rplsIdx][i] specifies the value of the variable AbsDeltaPocSt[listIdx][rplsIdx][i] as follows:

```
if( sps_weighted_pred_flag | | sps_weighted_bipred_flag )
  AbsDeltaPocSt[ listIdx ][ rplsIdx ][ i ] = abs_delta_poc_st
[ listIdx ][ rplsIdx ][ i ]
else
  AbsDeltaPocSt[ listIdx ][ rplsIdx ][ i ] = abs_delta_poc_st
[ listIdx ][ rplsIdx ][ i ] + 1
```

The value of abs_delta_poc_st[listIdx][rplsIdx][i] shall be in the range of 0 to $2^{15}-1$, inclusive.

The list DeltaPocValSt[listIdx][rplsIdx] is derived as follows:

```
for( i =0; i < num_ref_entries[ listIdx ][ rplsIdx ]; i++ )
  if(RefPicIdc [ listIdx ][ rplsIdx ][ i ] == 00)
    DeltaPoeValSt[ listIdx ][ rplsIdx ][ i ] =
AbsDeltaPoeSt[ listIdx ][ rplsIdx ][ i ] else if(RefPicIde
[ listIdx ][ rplsIdx ][ i ] == 01)
    DeltaPoeValSt[ listIdx ][ rplsIdx ][ i ] = 0 −
AbsDeltaPoeSt[ listIdx ][ rplsIdx ][ i ]
``` rpls_poc_lsb_lt[listIdx][rplsIdx][i] specifies the value of the picture order count modulo MaxPicOrderCntLsb of the picture referred to by the i-th entry in the ref_pic_list_struct(listIdx, rplsIdx) syntax structure. The length of the rpls_poc_lsb_lt[listIdx][rplsIdx][i syntax element is log2_max_pic_order_cnt_lsb_minus4+4 bits.

listIdx][rplsIdx][i] specifies the index, to the list of directly dependent layers, of the ILRP of i-th entry in ref_pic_list_struct(listIdx, rplsIdx) syntax structure to the list of directly dependent layers. The value of ilrp_idc[listIdx][rplsIdx][i] shall be in the range of 0 to the GeneralLayerIdx[nuh_layer_id]−1, inclusive.

Table 7 illustrates an example syntax of the ref_pic_list_struct( ) according to the techniques herein. It should be noted that comparing Table 7 to Table 6, a condition for signaling one of the bits is removed.

ing on whether the syntax structure is included in a slice header or an SPS, the following applies:

If present in a slice header, the ref_pic_list_struct (listIdx, rplsIdx) syntax structure specifies reference picture list listIdx of the current picture (the picture containing the slice).

Otherwise (present in an SPS), the ref_pic_list_struct (listIdx, rplsIdx) syntax structure specifies a candidate for reference picture list listIdx, and the term "the current picture" in the semantics specified in the remainder of this clause refers to each picture that 1) has one or more slices containing ref_pic_list_idx [listIdx] equal to an index into the list of the ref_pic_list_struct(listIdx, rplsIdx) syntax structures included in the SPS, and 2) is in a CVS that refers to the SPS.

num_ref_entries[listIdx][rplsIdx] specifies the number of entries in the ref_pic_list_struct(listIdx, rplsIdx) syntax structure. The value of num_ref_entries[listIdx][rplsIdx] shall be in the range of 0 to sps_max_dec_pic_buffering_minus1+14, inclusive.

ltrp_in_slice_header_flag[listIdx][rplsIdx] equal to 0 specifies that the POC LSBs of the LTRP entries in the ref_pic_list_struct(listIdx, rplsIdx) syntax structure are present in the ref_pic_list_struct(listIdx, rplsIdx) syntax structure. ltrp_in_slice_header_flag[listIdx][rplsIdx] equal to 1 specifies that the POC LSBs of the LTRP entries in the ref_pic_list_struct(listIdx, rplsIdx) syntax structure are not present in the ref_pic_list_struct(listIdx, rplsIdx) syntax structure.

ref_pic_idc_bit1[listIdx][rplsIdx][i] and ref_pic_idc_bit0 [listIdx][rplsIdx][i] are used for the derivation of variable RefPicIdc[listIdx][rplsIdx][i]. When not present ref_pic_idc_bit1[listIdx][rplsIdx][i] is inferred to be equal to 0. The variable RefPicIdc[listIdx][rplsIdx][i] is derived as follows:

RefPicIdc[listIdx][rplsIdx][i]=ref_pic_idc_bit1[listIdx] [rplsIdx][i]<<1|ref_pic_idc_bit0[listIdx][rplsIdx][i]

RefPicIdc[listIdx][rplsIdx][i] equal to:

00 specifies that the i-th entry in the ref_pic_list_struct (listIdx, rplsIdx) syntax structure is an STRP entry and has a value greater than or equal to 0,

TABLE 7

| | Descriptor |
|---|---|
| ref_pic_list_struct( listIdx, rplsIdx ) { | |
|   num_ref_entries[ listIdx ][ rplsIdx ] | ue(v) |
|   if( long_term_ref_pics_flag ) | |
|     ltrp_in_slice_header_flag[ listIdx ][ rplsIdx ] | u(1) |
|   for( i = 0, j = 0; i < num_ref_entries[ listIdx ][ rplsIdx ]; i++ ) { | |
|     if(inter_layer_ref_pics_present_flag | | long_term_ref_pics_flag) | |
|       ref_pic_idc_bit1[ listIdx ][ rplsIdx ][ i ] | u(1) |
|     ref_pic_idc_bit0[ listIdx ][ rplsIdx ][ i ] | u(1) |
|     if( (RefPicIdc[ listIdx ][ rplsIdx ][ i ] == 00 | | RefPicIdc[ listIdx ][ rplsIdx ][ i ] == 01)) { | |
|       abs_delta_poc_st[ listIdx ][ rplsIdx ][ i ] | ue(v) |
|     } else if(RefPicIdc[ listIdx ][ rplsIdx ][ i ] == 11) && !ltrp_in_slice_header_flag[ listIdx ][ rplsIdx ] ) | |
|       rpls_poc_lsb_lt[ listIdx ][ rplsIdx ][ j++ ] | u(v) |
|     else if(RefPicIdc[ listIdx ][ rplsIdx ][ i ] == 10))) | |
|       ilrp_idc[ listIdx ][ rplsIdx ][ i ] | ue(v) |
|   } | |
| } | |

With respect to Table 7, in one example, the semantics may be based on the following:

The ref_pic_list_struct(listIdx, rplsIdx) syntax structure may be present in an SPS or in a slice header. Depend- 01 specifies that the i-th entry in the ref_pic_list_struct (listIdx, rplsIdx) syntax structure is an STRP entry and has a value less than 0, 10 specifies that the i-th entry in the ref_pic_list_struct (listIdx, rplsIdx) syntax structure is an ILRP entry, 11 specifies that the i-th entry in the ref_pic_list_struct (listIdx, rplsIdx) syntax structure is an LTRP entry.

The variable NumLtrpEntries[listIdx][rplsIdx] is derived as follows:

```
for( i = 0, NumEtrpEntries[ listIdx ][ rplsIdx ] = 0; i <
num_ref_entries[ listIdx ][ rplsIdx ]; i++ )
    if(RefPicIdc[ listIdx ][ rplsIdx ][ i ] == 11 )
        NumLtrpEntries[ listIdx ][ rplsIdx ]++
``` abs_delta_poc_st[listIdx][rplsIdx][i] specifies the value of the variable AbsDeltaPocSt[listIdx][rplsIdx][i] as follows:

```
if( sps_weighted_pred_flag  | |  sps_weighted_bipred_flag )
    AbsDeltaPocSt[ listIdx ][ rplsIdx ][ i ] =      abs_delta_poc_st[ listIdx ][ rplsIdx ][ i ]
else
    AbsDeltaPocSt[ listIdx ][ rplsIdx ][ i ] =      abs_delta_poc_st[ listIdx ][ rplsIdx ][ i ] + 1
```

The value of abs_delta_poc_st[listIdx][rplsIdx][i] shall be in the range of 0 to $2^{15}-1$, inclusive.

The list DeltaPocValSt[listIdx][rplsIdx] is derived as follows:

```
for( i = 0; i < num_ref_entries[ listIdx ][ rplsIdx ]; i++ )
if(RefPicIdc[ listIdx ][ rplsIdx ][ i ] == 00)
    DeltaPocValSt[ listIdx ][ rplsIdx ][ i ] = AbsDeltaPocSt[ listIdx ][ rplsIdx ][ i ]   else if(RefPicIdc[ listIdx ][ rplsIdx ][ i ] == 01)
    DeltaPocValSt[ listIdx ][ rplsIdx ][ i ] = 0 − AbsDeltaPocSt[ listIdx ][ rplsIdx ][ i ]
``` rpls_poc_lsb_lt[listIdx][rplsIdx][i] specifies the value of the picture order count modulo MaxPicOrderCntLsb of the picture referred to by the i-th entry in the ref_pic_list_struct(listIdx, rplsIdx) syntax structure. The length of the rpls_poc_lsb_lt[listIdx][rplsIdx][i] syntax element is log2_max_pic_order_cnt_lsb_minus4+4 bits.

ilrp_idc[listIdx][rplsIdx][i] specifies the index, to the list of directly dependent layers, of the ILRP of i-th entry in ref_pic_list_struct(listIdx, rplsIdx) syntax structure to the list of directly dependent layers. The value of ilrp_idc[listIdx][rplsIdx][i] shall be in the range of 0 to the GeneralLayerIdx[nuh_layer_id]−1, inclusive.

Table 8 illustrates an example syntax of the ref_pic_list_struct( ) according to the techniques herein. It should be noted that comparing Table 8 to Table 6, Table 8 uses a different way of specifying conditions within ref_pic_list_struct(listIdx, rplsIdx).

TABLE 8

| | Descriptor |
|---|---|
| ref_pic_list_struct( listIdx, rplsIdx ) { | |
|   num_ref_entries[ listIdx ][ rplsIdx ] | ue(v) |
|   if( long_term_ref_pics_flag ) | |
|     ltrp_in_slice_header_flag[ listIdx ][ rplsIdx ] | u(1) |
|     for( i = 0, j = 0; i < num_ref_entries[ listIdx ][ rplsIdx ]; i++) { | |
|       if(inter_layer_ref_pics_present_flag \| \| long_term_ref_pics_flag) | |
|         ref_pic_idc_bitX[ listIdx ][ rplsIdx ][ i ] | u(1) |
|       if(ref_pic_idc_bitX[ listIdx ][ rplsIdx ][ i ] \| \| (!inter_layer_ref_pics_present_flag && !long_term_ref_pics_flag) \| \| (inter_layer_ref_pics_present_flag && long_term_ref_pics_flag)) | |
|         ref_pic_idc_bitY[ listIdx ][ rplsIdx ][ i ] | u(1) |
|       if(inter_layer_ref_pics_present_flag && long_term_ref_pics_flag && (RefPicIdc[ listIdx ][ rplsIdx ][ i ] == 00 \| \| RefPicIdc[ listIdx ][ rplsIdx ][ i ] == 01)) \| \| ((inter_layer_ref_pics_present_flag \| \| long_term_ref_pics_flag) && ref_pic_idc_bitX [ listIdx ][ rplsIdx ][ i ] == 1)) { | |
|         abs_delta_poc_st[ listIdx ][ rplsIdx ][ i ] | ue(v) |
|       } else if(((inter_layer_ref_pics_present_flag && long_term_ref_pics_flag && RefPicIdc[ listIdx ][ rplsIdx ][ i ] == 11) \| \| (!inter_layer_ref_pics_present_flag && long_term_ref_pics_flag && ref_pic_idc_bitX[ listIdx ][ rplsIdx ][ i ] == 0)) && !ltrp_in_slice_header_flag[ listIdx ][ rplsIdx ] ) | |
|         rpls_poc_lsb_lt[ listIdx ][ rplsIdx ][ j++ ] | u(v) |
|       else if((inter_layer_ref_pics_present_flag && long_term_ref_pics_flag && RefPicIdc[ listIdx ][ rplsIdx ][ i ] == 10) \| \| (inter_layer_ref_pics_present_flag && !long_term_ref_pics_flag && ref_pic_idc_bitX [ listIdx ][ rplsIdx ][ i ] == 0)) | |
|         ilrp_idc[ listIdx ][ rplsIdx ][ i ] | ue(v) |
|     } | |
| } | |

With respect to Table 8, in one example, the semantics may be based on the semantics provided above for Table 6. In one example, the semantics of ref_pic_idc_bit1[listIdx][rplsIdx][i] and ref_pic_idc_bit0[listIdx][rplsIdx][i] may be based on the following:

ref_pic_idc_bitX[listIdx][rplsIdx][i] and ref_pic_idc_bitY[listIdx][rplsIdx][i] are used for the signaling of information about i-th entry in the reference picture list. When not present ref_pic_idc_bitX[listIdx][rplsIdx][i] is inferred to be equal to 0.

If inter_layer_ref_pics_present_flag and long_term_ref_pics_flag are both equal to 1 or are both equal to 0 following applies:

A 2-bit variable RefPicIdc[listIdx][rplsIdx][i] is derived as follows: RefPicIdc[listIdx][rplsIdx][i]=ref_pic_idc_bitX[listIdx][rplsIdx][i]<<1|ref_pic_idc_bitY[listIdx][rplsIdx][i]

RefPicIdc[listIdx][rplsIdx][i] equal to:

00 specifies that the i-th entry in the ref_pic_list_struct (listIdx, rplsIdx) syntax structure is an STRP entry and has a value greater than or equal to 0, 01 specifies that the i-th entry in the ref_pic_list_struct (listIdx, rplsIdx) syntax structure is an STRP entry and has a value less than 0, 10 specifies that the i-th entry in the ref_pic_list_struct (listIdx, rplsIdx) syntax structure is an ILRP entry, 11 specifies that the i-th entry in the ref_pic_list_struct (listIdx, rplsIdx) syntax structure is an LTRP entry.

Otherwise (i.e. when inter_layer_ref_pics_present_flag is equal to 1 and long_term_ref_pics_flag is equal to 0 or when inter_layer_ref_pics_present_flag is equal to 0 and long_term_ref_pics_flag is equal to 1):

ref_pic_idc_bitX[listIdx][rplsIdx][i] equal to 0 specifies that the i-th entry in the ref_pic_list_struct(listIdx, rplsIdx) syntax structure is:

an ILRP entry if inter_layer_ref_pics_present_flag is equal to 1 or is an LTRP entry if long_term_ref_pics_flag is equal to 1 ref_pic_idc_bitX[listIdx][rplsIdx][i] equal to 1 specifies that:

if ref_pic_idc_bitY[listIdx][rplsIdx][i] equal to 0 then the i-th entry in the ref_pic_list_struct(listIdx, rplsIdx) syntax structure is an STRP entry and has a value greater than or equal to 0 and RefPicIdc [listIdx][rplsIdx][i] is derived as 00 if ref_pic_idc_bitY[listIdx][rplsIdx][i] equal to 1 then the i-th entry in the ref_pic_list_struct(listIdx, rplsIdx) syntax structure is an STRP entry and has a value less than 0 and RefPicIdc[listIdx][rplsIdx][i] is derived as 01.

It should be noted that the condition:

```
if(inter_layer_ref_pics_present_flag && long_term_ref_pics_flag &&
(RefPicIdc[ listIdx ][ rplsIdx ][ i ] == 00 | | RefPicIdc[ listIdx ][ rplsIdx ][ i ] ==
01)) | | ((inter_layer_ref_pics_present_flag | | long_term_ref_pics_flag) &&
ref_pic_idc_bitX [ listIdx ][ rplsIdx ][ i ] == 1)) {
    abs_delta_poc_st[ listIdx ][ rplsIdx ][ i ]                                    ue(v)
```

May instead be written as:

```
if(inter_layer_ref_pics_present_flag && long_term_ref_pics_flag &&
(RefPicIdc[ listIdx ][ rplsIdx ][ i ] == 00 | | RefPicIdc[ listIdx ][ rplsIdx ][ i ] ==
01)) | | (!inter_layer_ref_pics_present_flag && long_term_ref_pics_flag &&
ref_pic_idc_bitX [ listIdx ][ rplsIdx ][ i ] == 1) | |
(inter_layer_ref_pics_present_flag && !long_term_ref_pics_flag &&
ref_pic_idc_bitX [ listIdx ][ rplsIdx ][ i ] == 1)) {
    abs_delta_poc_st[ listIdx ][ rplsIdx ][ i ]                                    ue(v)
```

Table 9 illustrates an example syntax of the ref_pic_list_struct( ) according to the techniques herein. It should be noted that comparing Table 9 to Table 6, Table 9 has the same bit efficiency as Table 6, but is more verbose.

TABLE 9

| | Descriptor |
|---|---|
| ref_pic_list_struct( listIdx, rplsIdx ) { | |
|   num_ref_entries[ listIdx ][ rplsIdx ] | ue(v) |
|   if( long_term_ref_pics_flag ) | |
|     ltrp_in_slice_header_flag[ listIdx ][ rplsIdx ] | u(1) |
|   for( i = 0, j = 0; i < num_ref_entries[ listIdx ][ rplsIdx ]; i++) { | |
|     if(inter_layer_ref_pics_present_flag && long_term_ref_pics_flag) { | |
|       ref_pic_idc_bit1[ listIdx ][ rplsIdx ][ i ] | u(1) |
|       ref_pic_idc_bit0[ listIdx ][ rplsIdx ][ i ] } | u(1) |
|     else if(inter_layer_ref_pics_present_flag && (long_term_ref_pics_flag==0)) { | |
|       ref_pic_idc_bit1[ listIdx ][ rplsIdx ][ i ] | u(1) |
|       if(ref_pic_idc_bit1[ listIdx ][ rplsIdx ][ i ]) | |
|         ref_pic_idc_bit0[ listIdx ][ rplsIdx ][ i ] } | u(1) |
|     else if((inter_layer_ref_pics_present_flag==0) && long_term_ref_pics_flag) { | |
|       ref_pic_idc_bit1[ listIdx ][ rplsIdx ][ i ] | u(1) |

TABLE 9-continued

| | Descriptor |
|---|---|
|     if(ref_pic_idc_bit1[ listIdx ][ rplsIdx ][ i ])<br>      ref_pic_idc_bit0[ listIdx ][ rplsIdx ][ i ] }<br>  else<br>    ref_pic_idc_bit0[ listIdx ][ rplsIdx ][ i ]<br>...<br>  }<br>} | u(1)<br><br>u(1) |

With respect to Table 9, in one example, the semantics may be based on the semantics provided above for Table 6 and the semantics of ref_pic_idc_bit1[listIdx][rplsIdx][i] and ref_pic_idc_bit0[listIdx][rplsIdx][i] may be based on the following:

ref_pic_idc_bit1[listIdx][rplsIdx][i] and ref_pic_idc_bit0[listIdx][rplsIdx][i] are used for the signaling of information about i-th entry in the reference picture list.

If inter_layer_ref_pics_present_flag and long_term_ref_pics_flag are both equal to 1 following applies:

A 2-bit variable RefPicIdc[listIdx][rplsIdx][i] is derived as follows:

RefPicIdc[listIdx][rplsIdx][i]=ref_pic_idc_bitX[listIdx][rplsIdx][i]<<1|ref_pic_idc_bitY[listIdx][rplsIdx][i]

RefPicIdc[listIdx][rplsIdx][i] equal to:
- 00 specifies that the i-th entry in the ref_pic_list_struct (listIdx, rplsIdx) syntax structure is an STRP entry and has a value greater than or equal to 0,
- 01 specifies that the i-th entry in the ref_pic_list_struct (listIdx, rplsIdx) syntax structure is an STRP entry and has a value less than 0,
- 10 specifies that the i-th entry in the ref_pic_list_struct (listIdx, rplsIdx) syntax structure is an ILRP entry,
- 11 specifies that the i-th entry in the ref_pic_list_struct (listIdx, rplsIdx) syntax structure is an LTRP entry.

If inter_layer_ref_pics_present_flag is equal to 1 and long_term_ref_pics_flag is equal to 0:

ref_pic_idc_bit1[listIdx][rplsIdx][i] equal to 0 specifies that the i-th entry in the ref_pic_list_struct(listIdx, rplsIdx) syntax structure is an ILRP entry.

If ref_pic_idc_bit0[listIdx][rplsIdx][i] is present, If ref_pic_idc_bit0[listIdx][rplsIdx][i] is present, 2-bit variable RefPicIdc[listIdx][rplsIdx][i] is derived as follows:

RefPicIdc[listIdx][rplsIdx][i]=ref_pic_idc_bitX[listIdx][rplsIdx][i]<<|ref_pic_idc_bitY[listIdx][rplsIdx][i]

RefPicIdc[listIdx][rplsIdx][i] equal to:
- 10 specifies that the i-th entry in the ref_pic_list_struct (listIdx, rplsIdx) syntax structure is an STRP entry and has a value greater than or equal to 0,
- 11 specifies that the i-th entry in the ref_pic_list_struct (listIdx, rplsIdx) syntax structure is an STRP entry and has a value less than 0.

If inter_layer_ref_pics_present_flag is equal to 0 and long_term_ref_pics_flag is equal to 1:

ref_pic_idc_bit1[listIdx][rplsIdx][i] equal to 0 specifies that the i-th entry in the ref_pic_list_struct(listIdx, rplsIdx) syntax structure is an LTRP entry.

If ref_pic_idc_bit0[listIdx][rplsIdx][i] is present, 2-bit variable RefPicIdc[listIdx][rplsIdx][i] is derived as follows:

RefPicIdc[listIdx][rplsIdx][i]=ref_pic_idc_bitX[listIdx][rplsIdx][i]<<1 I ref_pic_idc_bitY[listIdx][rplsIdx][i]

RefPicIdc[listIdx][rplsIdx][i] equal to:
- 10 specifies that the i-th entry in the ref_pic_list_struct (listIdx, rplsIdx) syntax structure is an STRP entry and has a value greater than or equal to 0,
- 11 specifies that the i-th entry in the ref_pic_list_struct (listIdx, rplsIdx) syntax structure is an STRP entry and has a value less than 0.

When inter_layer_ref_pics_present_flag is equal to 0 and long_term_ref_pics_flag is equal to 0:

ref_pic_idc_bit1[listIdx][rplsIdx][i] is inferred to be equal to 0. A 2-bit variable RefPicIdc[listIdx][rplsIdx][i] is derived as follows:

RefPicIdc[listIdx][rplsIdx][i]=ref_pic_idc_bitX[listIdx][rplsIdx][i]<<1|ref_pic_idc_bitY[listIdx][rplsIdx][i]

RefPicIdc[listIdx][rplsIdx][i] equal to:
- 00 specifies that the i-th entry in the ref_pic_list_struct (listIdx, rplsIdx) syntax structure is an STRP entry and has a value greater than or equal to 0,
- 01 specifies that the i-th entry in the ref_pic_list_struct (listIdx, rplsIdx) syntax structure is an STRP entry and has a value less than 0.

Table 10 illustrates an example syntax of the ref_pic_list_struct( ) according to the techniques herein.

TABLE 10

| | Descriptor |
|---|---|
| ref_pic_list_struct( listIdx, rplsIdx ) {<br>  num_ref_entries[ listIdx ][ rplsIdx ]<br>  if( long_term_ref_pics_flag )<br>    ltrp_in_slice_header_flag[ listIdx ][ rplsIdx ]<br>  for( i = 0, j = 0; i < num_ref_entries[ listIdx ][ rplsIdx ]; i++) {<br>    if(inter_layer_ref_pics_present_flag && long_term_ref_pics_flag)<br>      ref_pic_idc[ listIdx ][ rplsIdx ][ i ]<br>    else {<br>      if( inter_layer_ref_pics_present_flag )<br>        inter_layer_ref_pic_flag[ listIdx ][ rplsIdx ][ i ]<br>      if( !inter_layer_ref_pics_flag[ listIdx ][ rplsIdx ][ i ] ) {<br>        if( long_term_ref_pics_flag )<br>          st_ref_pic_flag[ listIdx ][ rplsIdx ][ i ]<br>      }<br>      if( st_ref_pic_flag[ listIdx ][ rplsIdx ][ i ]) {<br>        abs_delta_poc_st[ listIdx ][ rplsIdx ][ i ]<br>        if(!inter_layer_ref_pics_present_flag && !long_term_ref_pics_flag &&<br>(AbsDeltaPocSt[ listIdx ][ rplsIdx ][ i ] > 0) )<br>          strp_entry_sign_flag[ listIdx ][ rplsIdx ][ i ] | <br>ue(v)<br><br>u(1)<br><br><br>u(2)<br><br><br>u(1)<br><br><br>u(1)<br><br><br>ue(v)<br><br><br>u(1) |

TABLE 10-continued

| | Descriptor |
|---|---|
| `    } else if(!ltrp_in_slice_header_flag[ listIdx ][ rplsIdx ] )` | |
| `      rpls_poc_lsb_lt[ listIdx ][ rplsIdx ][ j++ ]` | u(v) |
| `  } else` | |
| `    ilrp_idc[ listIdx ][ rplsIdx ][ i ]` | ue(v) |
| `  }` | |
| `}` | |

With respect to Table 10, in one example, the semantics may be based on the following:

The ref_pic_list_struct(listIdx, rplsIdx) syntax structure may be present in an SPS or in a slice header. Depending on whether the syntax structure is included in a slice header or an SPS, the following applies:

- If present in a slice header, the ref_pic_list_struct (listIdx, rplsIdx) syntax structure specifies reference picture list listIdx of the current picture (the picture containing the slice).
- Otherwise (present in an SPS), the ref_pic_list_struct (listIdx, rplsIdx) syntax structure specifies a candidate for reference picture list listIdx, and the term "the current picture" in the semantics specified in the remainder of this clause refers to each picture that 1) has one or more slices containing ref_pic_list_idx [listIdx] equal to an index into the list of the ref_pic_list_struct(listIdx, rplsIdx) syntax structures included in the SPS, and 2) is in a CVS that refers to the SPS.

num_ref_entries[listIdx][rplsIdx] specifies the number of entries in the ref_pic_list_struct(listIdx, rplsIdx) syntax structure. The value of num_ref_entries[listIdx][rplsIdx] shall be in the range of 0 to sps_max_dec_pic_buffering_minus1+14, inclusive.

ltrp_in_slice_header_flag[listIdx][rplsIdx] equal to 0 specifies that the POC LSBs of the LTRP entries in the ref_pic_list_struct(listIdx, rplsIdx) syntax structure are present in the ref_pic_list_struct(listIdx, rplsIdx) syntax structure. ltrp_in_slice_header_flag[listIdx][rplsIdx] equal to 1 specifies that the POC LSBs of the LTRP entries in the ref_pic_list_struct(listIdx, rplsIdx) syntax structure are not present in the ref_pic_list_struct(listIdx, rplsIdx) syntax structure.

ref_pic_idc[listIdx][rplsIdx][i] specifies information about i-th entry in the ref_pic_list_struct(listIdx, rplsIdx) syntax structure. ref_pic_idc[listIdx][rplsIdx][i] equal to:

00 specifies that the i-th entry in the ref_pic_list_struct (listIdx, rplsIdx) syntax structure is an STRP entry and has a value greater than or equal to 0, 01 specifies that the i-th entry in the ref_pic_list_struct (listIdx, rplsIdx) syntax structure is an STRP entry and has a value less than 0, 10 specifies that the i-th entry in the ref_pic_list_struct (listIdx, rplsIdx) syntax structure is an ILRP entry, 11 specifies that the i-th entry in the ref_pic_list_struct (listIdx, rplsIdx) syntax structure is an LTRP entry.

inter_layer_ref_pic_flag[listIdx][rplsIdx][i] equal to 1 specifies that the i-th entry in the ref_pic_list_struct (listIdx, rplsIdx) syntax structure is an ILRP entry. inter_layer_ref_pic_flag[listIdx][rplsIdx][i] equal to 0 specifies that the i-th entry in the ref_pic_list_struct (listIdx, rplsIdx) syntax structure is not an ILRP entry. When not present, the value of inter_layer_ref_pic_flag [listIdx][rplsIdx][i] is inferred to be equal to 1 if inter_layer_ref_pics_present_flag is equal to 1 and long_term_ref_pics_flag is equal to 1 and ref_pic_idc [listIdx][rplsIdx][i] is equal to 10 and 0 otherwise.

st_ref_pic_flag[listIdx][rplsIdx][i] equal to 1 specifies that the i-th entry in the ref_pic_list_struct(listIdx, rplsIdx) syntax structure is an STRP entry. st_ref_pic_flag[listIdx][rplsIdx][i] equal to 0 specifies that the i-th entry in the ref_pic_list_struct(listIdx, rplsIdx) syntax structure is an LTRP entry. When st_ref_pic_flag[listIdx][rplsIdx][i] is not present its value is inferred as follows:

- If inter_layer_ref_pics_present_flag is equal to 1 and long_term_ref_pics_flag is equal to 1 and ref_pic_idc[listIdx][rplsIdx][i] is equal to 00 or 01, the value of st_ref_pic_flag[listIdx][rplsIdx][i] is inferred to be equal to 1.
- If inter_layer_ref_pics_present_flag is equal to 1 and long_term_ref_pics_flag is equal to 1 and ref_pic_idc[listIdx][rplsIdx][i] is equal to 11 or 10, the value of st_ref_pic_flag[listIdx][rplsIdx][i] is inferred to be equal to 0.
- Otherwise when inter_layer_ref_pic_flag[listIdx][rplsIdx][i] is equal to 0 and st_ref_pic_flag[listIdx][rplsIdx][i] is not present, the value of st_ref_pic_flag[listIdx][rplsIdx][i] is inferred to be equal to 1.

In an example variant, the following may apply:
When st_ref_pic_flag[listIdx][rplsIdx][i] is not present its value is inferred as follows:

- If inter_layer_ref_pics_present_flag is equal to 1 and long_term_ref_pics_flag is equal to 1 and ref_pic_idc[listIdx][rplsIdx][i] is equal to 11 or 10, the value of st_ref_pic_flag[listIdx][rplsIdx][i] is inferred to be equal to 0.
- Otherwise when inter_layer_ref_pic_flag[listIdx][rplsIdx][i] is equal to 0 and st_ref_pic_flag[listIdx][rplsIdx][i] is not present, the value of st_ref_pic_flag[listIdx][rplsIdx][i] is inferred to be equal to 1.

In an example variant, the following may apply:
When st_ref_pic_flag[listIdx][rplsIdx][i] is not present its value is inferred as follows:

- If inter_layer_ref_pics_present_flag is equal to 1 and long_term_ref_pics_flag is equal to 1 and ref_pic_idc[listIdx][rplsIdx][i] is equal to 00 or 01, the value of st_ref_pic_flag[listIdx][rplsIdx][i] is inferred to be equal to 1.
- If inter_layer_ref_pics_present_flag is equal to 1 and long_term_ref_pics_flag is equal to 1 and ref_pic_idc[listIdx][rplsIdx][i] is equal to 11 or 10, the value of st_ref_pic_flag[listIdx][rplsIdx][i] is inferred to be equal to 0.
- Otherwise the value of st_ref_pic_flag[listIdx][rplsIdx] [i] is inferred to be equal to 1.

In an example variant, the following may apply:
When st_ref_pic_flag[listIdx][rplsIdx][i] is not present its value is inferred as follows:

- If inter_layer_ref_pics_present_flag is equal to 1 and long_term_ref_pics_flag is equal to 1 and ref_pic_idc[listIdx][rplsIdx][i] is equal to 11 or 10, the value of st_ref_pic_flag[listIdx][rplsIdx][i] is inferred to be equal to 0.
- Otherwise the value of st_ref_pic_flag[listIdx][rplsIdx] [i] is inferred to be equal to 1.

The variable NumLtrpEntries[listIdx][rplsIdx] is derived as follows:

```
for( i = 0, NumLtrpEntries[ listIdx ][ rplsIdx ] = 0; i <
num_ref_entries[ listIdx ][ rplsIdx ]; i++ )
    if( !inter_layer_ref_pic_flag[ listIdx ][ rplsIdx ][ i ] && !st_ref_pic_flag[ listIdx
][ rplsIdx ][ i ])
        NumLtrpEntries[ listIdx ][ rplsIdx ]++
``` abs_delta_poc_st[listIdx][rplsIdx][i] specifies the value of the variable AbsDeltaPocSt[listIdx][rplsIdx][i] as follows:

```
if( sps_weighted_pred_flag  | |  sps_weighted_bipred_flag )
    AbsDeltaPocSt[ listIdx ][ rplsIdx ][ i ] =      abs_delta_poc_st[ listIdx ][ rplsIdx ][ i ]
else
    AbsDeltaPocSt[ listIdx ][ rplsIdx ][ i ] =    abs_delta_poc_st[ listIdx ][ rplsIdx ][ i ] + 1
```

The value of abs_delta_poc_st[listIdx][rplsIdx][i] shall be in the range of 0 to $2^{15}-1$, inclusive.

strp_entry_sign_flag[listIdx][rplsIdx][i] equal to 1 specifies that i-th entry in the syntax structure ref_pic_list_struct(listIdx, rplsIdx) has a value greater than or equal to 0. strp_entry_sign_flag[listIdx][rplsIdx][i] equal to 0 specifies that the i-th entry in the syntax structure ref_pic_list_struct(listIdx, rplsIdx) has a value less than 0. When not present the value of strp_entry_sign_flag[listIdx][rplsIdx][i] is inferred to be equal to 0 if inter_layer_ref_pics_present_flag is equal to 1 and long_term_ref_pics_flag is equal to 1 and ref_pic_idc[listIdx][rplsIdx][i] is equal to 01, and 1 otherwise.

In an example variant, the following may apply:
When strp_entry_sign_flag [listIdx][rplsIdx][i] is not present its value is inferred as follows:
  If inter_layer_ref_pics_present_flag is equal to 1 and long_term_ref_pics_flag is equal to 1 and ref_pic_idc[listIdx][rplsIdx][i] is equal to 01, the value of strp_entry_sign_flag[listIdx][rplsIdx][i] is inferred to be equal to 0,
  Otherwise the value of strp_entry_sign_flag[listIdx][rplsIdx][i] is inferred to be equal to 1.

In an example variant, the following may apply:
When strp_entry_sign_flag [listIdx][rplsIdx][i] is not present its value is inferred as follows:
  If inter_layer_ref_pics_present_flag is equal to 1 and long_term_ref_pics_flag is equal to 1 and ref_pic_idc[listIdx][rplsIdx][i] is equal to 00, the value of strp_entry_sign_flag[listIdx][rplsIdx][i] is inferred to be equal to 1,
  If inter_layer_ref_pics_present_flag is equal to 1 and long_term_ref_pics_flag is equal to 1 and ref_pic_idc[listIdx][rplsIdx][i] is equal to 01, the value of strp_entry_sign_flag[listIdx][rplsIdx][i] is inferred to be equal to 0,
  Otherwise the value of strp_entry_sign_flag[listIdx][rplsIdx][i] is inferred to be equal to 1.

The list DeltaPocValSt[listIdx][rplsIdx] is derived as follows:

```
for( i = 0; i < num_ref_entries[ listIdx ][ rplsIdx ]; i++ )
    if( !inter_layer_ref_pic_flag[ listIdx ][ rplsIdx ][ i ] && st_ref_pic_flag[ listIdx ][
rplsIdx ][ i ] )
        DeltaPocValSt[ listIdx ][ rplsIdx ][ i ] =
( strp_entry_sign_flag listIdx ][ rplsIdx ][ i ] ) ?
    AbsDeltaPocSt[ listIdx ][ rplsIdx ][ i ] : 0 –
AbsDeltaPocSt[ listIdx ][ rplsIdx ][ i ]
``` rpls_poc_lsb_lt[listIdx][rplsIdx][i] specifies the value of the picture order count modulo MaxPicOrderCntLsb of the picture referred to by the i-th entry in the ref_pic_list_struct(listIdx, rplsIdx) syntax structure. The length of the rpls_poc_lsb_lt[listIdx][rplsIdx][i] syntax element is log2_max_pic_order_cnt_lsb_minus4+4 bits.

ilrp_idc[listIdx][rplsIdx][i] specifies the index, to the list of directly dependent layers, of the ILRP of i-th entry in ref_pic_list_struct(listIdx, rplsIdx) syntax structure to the list of directly dependent layers. The value of ilrp_idc[listIdx][rplsIdx][i] shall be in the range of 0 to the GeneralLayerIdx[nub_layer_id]−1, inclusive.

Referring to Table 2, in JVET-O2001, inter layer reference picture flag (inter_layer_ref_pic_flag[listIdx][rplsIdx][i]) is signaled for each entry in the reference picture list when inter_layer_ref_pics_present_flag is equal to 1. Thus, a total of num_ref_entries[listIdx][rplsIdx] number of inter layer reference picture flags are sent in this case for each reference picture list. In one example, according to the techniques herein, inter layer reference picture flag (inter_layer_ref_pic_flag[listIdx][rplsIdx][i]) may be conditionally signaled such that it is signaled only for layer which is not an independent layer. It should be noted that an independent layer may be a layer for which the corresponding vps_independent_layer_flag[i] is equal to 1, as provided above with respect to Table 1A. A layer which is not an independent layer may be termed non-independent layer. When not signaled, the value for inter_layer_ref_pic_flag[listIdx][rplsIdx][i] is inferred. This provides bit-savings.

Table 11 illustrates an example syntax of the ref_pic_list_struct( ) according to the techniques herein.

TABLE 11

| | Descriptor |
|---|---|
| ref_pic_list_struct( listIdx, rplsIdx ) { | |
|   num_ref_entries[ listIdx ][ rplsIdx ] | ue(v) |
|   if( long_term_ref_pics_flag ) | |
|     ltrp_in_slice_header_flag[ listIdx ][ rplsIdx ] | u(1) |
|   for( i = 0, j = 0; i < num_ref_entries[ listIdx ][ rplsIdx ]; i++) { | |
|     if( inter_layer_ref_pics_present_flag | |
| && !vps_independent_layer_flag[GeneralLayerIdx[ nuh_layer_id ]] ) | |
|       inter_layer_ref_pic_flag[ listIdx ][ rplsIdx ][ i ] | u(1) |
|     if( !inter_layer_ref_pics_flag[ listIdx ][ rplsIdx ][ i ] ) { | |
|       if( long_term_ref_pics_flag ) | |
|         st_ref_pic_flag[ listIdx ][ rplsIdx ][ i ] | u(1) |
|       if( st_ref_pic_ flag[ listIdx ][ rplsIdx ][ i ] ) { | |
|         abs_delta_poc_st[ listIdx ][ rplsIdx ][ i ] | ue(v) |
|         if( AbsDeltaPocSt[ listIdx ][ rplsIdx ][ i ] > 0 ) | |
|           strp_entry_sign_flag[ listIdx ][ rplsIdx ][ i ] | u(1) |
|       } else if( !ltrp_in_slice_header_flag[ listIdx ][ rplsIdx ] ) | |
|         rpls_poc_lsb_lt[ listIdx ][ rplsIdx ][ j++ ] | u(v) |
|     } else | |
|       ilrp_idc[ listIdx ][ rplsIdx ][ i ] | ue(v) |
|   } | |
| } | |

With respect to Table 11, in one example, the semantics may be based on the semantics provided above. Further, with respect to Table 11 the nuh_layer_id corresponds to the nuh_layer_id of the syntax structure which includes the ref_pic_list_struct(listIdx, rplsIdx) structure. Thus, when ref_pic_list_struct(listIdx, rplsIdx) is included in the SPS to signal candidate reference picture lists, then the nuh_layer_id is the nuh_layer_id value of that SPS NAL unit. When ref_pic_list_struct(listIdx, rplsIdx) is included in the slice header, then the nuh_layer_id is the nuh_layer_id value of the NAL unit containing the slice.

Alternatively, in one example, a conformance constraint may be imposed on inter_layer_ref_pics_present_flag based on if a layer is independent or non-independent layer. That is, in one example, the semantics of inter_layer_ref_pics_present_flag may be based on the following:

inter_layer_ref_pics_present_flag equal to 0 specifies that no ILRP is used for inter prediction of any coded picture in the CVS. inter_layer_ref_pics_flag equal to 1 specifies that ILRPs may be used for inter prediction of one or more coded pictures in the CVS. When sps_video_parameter_set_id is equal to 0, the value of inter_layer_ref_pics_present_flag is inferred to be equal to 0. When vps_independent_layer_flag[GeneralLayerIdx[nuh_layer_id]] is equal to 1, the value of inter_layer_ref_pics_present_flag is inferred to be equal to 0.

Or

When vps_independent_layer_flag[GeneralLayerIdx[nuh_layer_id]] is equal to 1, the value of inter_layer_ref_pics_present_flag shall be equal to 0.

Also:

When sps_video_parameter_set_id is equal to 0, the value of inter_layer_ref_pics_present_flag-shall be equal to 0.

Additionally following inference rule may be added:

vps_independent_layer_flag[i] equal to 1 specifies that the layer with index i does not use inter-layer prediction. vps_independent_layer_flag[i] equal to 0 specifies that the layer with index i may use inter-layer prediction and vps_layer_dependency_flag[i] is present in VPS. When not present the value of vps_independent_layer_flag[i] is inferred to be equal to 1.

In one example, according to the techniques herein, the number of inter-layer reference prediction entries signaled may be kept track of and inter layer reference picture flag (inter_layer_ref_pic_flag[listIdx][rplsIdx][i]) may be conditionally signaled such that it is signalled only when the number of signalled inter-layer reference prediction entries in the reference picture list is less than or equal to the number of direct reference layers (or number of direct dependent layers). When not signalled the value for inter_layer_ref_pic_flag[listIdx][rplsIdx][i] is inferred in this case. This provides bit-savings. Table 12 illustrates an example syntax of the ref_pic_list_struct( ) according to the techniques herein.

TABLE 12

| | Descriptor |
|---|---|
| ref_pic_list_struct( listIdx, rplsIdx ) { | |
|   num_ref_entries[ listIdx ][ rplsIdx ] | ue(v) |
|   if( long_term_ref_pics_flag ) | |
|     ltrp_in_slice_header_flag[ listIdx ][ rplsIdx ] | u(1) |
|   for( i = 0, NumILRPEntries=0; i < num_ref_entries[ listIdx ][ rplsIdx ]; i++) { | |
|     if( inter_layer_ref_pics_present_flag && (NumILRPEntries < NumDirectReferenceLayers[ GeneralLayerIdx[ nuh_layer_id ] ])) | |
|       inter_layer_ref_pic_flag[ listIdx ][ rplsIdx ][ i ] | u(1) |
|     if( !inter_layer_ref_pics_flag[ listIdx ][ rplsIdx ][ i ] ) { | |
|       if( long_term_ref_pics_flag ) | |

TABLE 12-continued

|  | Descriptor |
|---|---|
| st_ref_pic_flag[ listIdx ][ rplsIdx ][ i ] | u(1) |
| if( st_ref_pic_flag[ listIdx ][ rplsIdx ][ i ] ) { |  |
| abs_delta_poc_st[ listIdx ][ rplsIdx ][ i ] | ue(v) |
| if( AbsDeltaPocSt[ listIdx ][ rplsIdx ][ i ] > 0 ) |  |
| strp_entry_sign_flag[ listIdx ][ rplsIdx ][ i ] | u(1) |
| } else if( !ltrp_in_slice_header_flag[ listIdx ][ rplsIdx ] ) |  |
| rpls_poc_lsb_lt[ listIdx ][ rplsIdx ][ j++ ] | u(v) |
| } else { |  |
| ilrp_idc[ listIdx ][ rplsIdx ][ i ] | ue(v) |
| NumILRPEntries++ |  |
| } |  |
| } |  |
| } |  |

With respect to Table 12, in one example, the semantics may be based on the semantics provided above. Further, with respect to Table 12, in one example, according to the techniques herein, NumDirectReferenceLayers[i] may be derived as follows based on the following semantics of syntax element vps_direct_dependency_flag:

vps_direct_dependency_flag[i][j] equal to 0 specifies that the layer with index j is not a direct reference layer for the layer with index i. vps_direct_dependency_flag[i][j] equal to 1 specifies that the layer with index j is a direct reference layer for the layer with index i. When vps_direct_dependency_flag[i][j] is not present for i and j in the range of 0 to vps_max_layers_minus1, inclusive, it is inferred to be equal to 0.

The variable DirectDependentLayerIdx[i][j], specifying the j-th direct dependent layer of the i-th layer, is derived as follows:

```
for( i = 1; i < vps_max_layers_minus1; i-- )
    if( !vps_independent_layer_flag[ i ] )
        for( j = i, k = 0; j  >=  0; j-- )
            if( vps_direct_dependency_flag[ i ][ j ] )
                DirectDependentLayerIdx[ i ][ k++ ] = j
NumDirectReferenceLayers[ i ] = (vps_independent_layer_flag[ i ] ? 0:k)
```

In another example, the condition above may be modified from (NumILRPEntries<NumDirectReferenceLayers[GeneralLayerIdx[nuh_layer_id]]) to (NumILRPEntries<=NumDirectReferenceLayers[GeneralLayerIdx[nuh_layer_id]])

It should be noted that in the semantics for syntax element, vps_direct_dependency_flag provided above, there is a bug in the for loop which derives the DirectDependentLayerIdx [i][j] for a j-th direct reference layer of the i-th layer. In particular, with the bug, the value of vps_direct_dependency_flag[i][j] needs to be signalled when i is equal to j. This wastes bits. In one example, according to the techniques herein, the semantics of syntax element vps_direct_dependency_flag may be based on the following:

vps_direct_dependency_flag[i][j] equal to 0 specifies that the layer with index j is not a direct reference layer for the layer with index i. vps_direct_dependency_flag[i][j] equal to 1 specifies that the layer with index j is a direct reference layer for the layer with index i. When vps_direct_dependency_flag[i][j] is not present for i and j in the range of 0 to vps_max_layers_minus1, inclusive, it is inferred to be equal to 0.

The variable DirectDependentLayerIdx[i][j], specifying the j-th direct dependent layer of the i-th layer, is derived as follows:

```
for( i = 1; i < vps_max_layers_minus1; i-- )
    if( !vps_independent_layer_flag[ i ] )
        for( j = i-1, k = 0; j  >=  0; j-- )
            if( vps_direct_dependency_flag[ i ][ j ] )
                DirectDependentLayerIdx[ i ][ k ++] = j
```

The variable GeneralLayerIdx[i], specifying the layer index of the layer with nuh_layer_id equal to vps_layer_id[i], is derived as follows:

```
for( i = 0; i  <=  vps_max_layers_minus1; i++ )
    GeneralLayerIdx[ vps_layer_id[ i ] ] = i
```

In one example, according to the techniques herein, the derived variables DirectDependencyLayerIdx[i][j] is modified to DirectReferenceLayerIdx[i][j] as these specify the j-th direct reference layer for the i-th layer and not the j-th dependent layer of the i-the layer. That is, in one example, according to the techniques herein, the semantics of syntax element vps_direct_dependency_flag may be based on the following:

vps_direct_dependency_flag[i][j] equal to 0 specifies that the layer with index j is not a direct reference layer for the layer with index i. vps_direct_dependency_flag[i][j] equal to 1 specifies that the layer with index j is a direct reference layer for the layer with index i. When vps_direct_dependency_flag[i][j] is not present for i and j in the range of 0 to vps_max_layers_minus1, inclusive, it is inferred to be equal to 0.

The variable DirectReferenceLayerIdx[i][j], specifying the j-th direct reference layer of the i-th layer, and variable NumDirectReferenceLayers[i], specifying the number of direct reference layers for the i-th layer are derived as follows:

```
for( i = 1; i < vps_max_layers_minus1; i-- ) {
    if( !vps_independent_layer_flag[ i ] )
        for( j = i, k = 0; j  >=  0; j-- )
            if( vps_direct_dependency_flag[ i ][ j ] )
                DirectReferenceLayerIdx[ i ][ k++ ] = j
    NumDirectReferenceLayers[ i ] = (vps_independent layer flag[ i ] ? 0:k)
}
```

In a variant example, NumDirectReferenceLayers[i]=k
The variable GeneralLayerIdx[i], specifying the layer index of the layer with nuh_layer_id equal to vps_layer_id[i], is derived as follows:

```
for( i = 0; i <= vps_max_layers_minus1; i++ )
    GeneralLayerIdx[ vps_layer_id[ i ] ] = i
```

With respect to the ref_pic_list_struct(listIdx, rplsIdx) syntax structures described herein, in one example, according to the techniques herein, the semantics of syntax elements abs_delta_poc_st, strp_entry_sign_flag, and ilrp_idc may be based on the following:

abs_delta_poc_st[listIdx][rplsIdx][i] when the i-th entry is the first STRP entry in ref_pic_list_struct(listIdx, rplsIdx) syntax structure, specifies the absolute difference between the picture order count values of the current picture and the picture referred to by the i-th entry, or, when the i-th entry is an STRP entry but not the first STRP entry in the ref_pic_list_struct(listIdx, rplsIdx) syntax structure, specifies the absolute difference between the picture order count values of the pictures referred to by the i-th entry and by the previous STRP entry in the ref_pic_list_struct(listIdx, rplsIdx) syntax structure. Specifies the value of the variable AbsDeltaPocSt[listIdx rplsIdx][i] is derived as follows:

```
if( sps_weighted_pred_flag  ||  sps_weighted_bipred_flag )
    AbsDeltaPocSt[ listIdx ][ rplsIdx ][ i ] =     abs_delta_poc_st[ listIdx ][ rplsIdx ][ i ]
else
    AbsDeltaPocSt[ listIdx ][ rplsIdx ][ i ] =     abs_delta_poc_st[ listIdx ][ rplsIdx ][ i ] + 1
```

The value of abs_delta_poc_st[listIdx][rplsIdx][i] shall be in the range of 0 to $2^{15}-1$, inclusive.

strp_entry_sign_flag[istIdx][rplsIdx][i] equal to 1 specifies that i-th entry in the syntax structure ref_pic_list_struct(listIdx, rplsIdx) has a value greater than or equal to 0. strp_entry_sign_flag[listIdx][rplsIdx][i] equal to 0 specifies that the i-th entry in the syntax structure ref_pic_list_struct(listIdx, rplsIdx) has a value less than 0. When not present, the value of strp_entry_sign_flag[listIdx][rplsIdx][i] is inferred to be equal to 1.

The list DeltaPocValSt[listIdx][rplsIdx] is derived as follows:

```
for( i = 0, prevSTRPIdx=0; i < num_ref_entries[ listIdx ][ rplsIdx ]; i++ )
    if( !inter_layer_ref_pic_flag[ listIdx ][ rplsIdx ][ i ] && st_ref_pic_flag[ listIdx ][
rplsIdx ][ i ] ) {
        DeltaPocValSt[ listIdx ][ rplsIdx ][ i ] =
( strp_entry_sign_flag[ listIdx ][ rplsIdx ][ i ] ) ?         AbsDeltaPocSt[ listIdx ][ rplsIdx ][ i ]
 : 0 - AbsDeltaPocSt[ listIdx ][ rplsIdx ][ i ]
        if( i!=0){
            DeltaPocValSt[ listIdx ][ rplsIdx ][ i ] =
DeltaPocValSt[ listIdx ][ rplsIdx ][ i ] + DeltaPocValSt[ listIdx ][ rplsIdx ][ prevStrpIdx ]
            prevStrpIdx = i
        }
    }
```

In a variant example,

```
if( i!=0){
    DeltaPocValSt[ listIdx ][ rplsIdx ][ i ] =
DeltaPocValSt[ listIdx ][ rplsIdx ][ i ] - DeltaPocValSt[ listIdx ][ rplsIdx ][ prevStrpIdx ]
    prevStrpIdx = i
}
``` ilrp_idc[listIdx][rplsIdx][i] specifies the index, to the list of directly reference layers (or direct dependent layers), of the ILRP of i-th entry in ref_pic_list_struct(listIdx, rplsIdx) syntax structure to the list of directly dependent layers. The value of ilrp_idc[listIdx][rplsIdx][i] shall be in the range of 0 to the GeneralLayerIdx[nuh_layer_id]−1, inclusive.

As described above, JVET-O2001 provides a decoding process for generating unavailable reference pictures. It should be noted that the decoding process for generating unavailable reference pictures in JVET-O2001 does not properly handle inter-layer reference pictures signaling in reference picture lists. According to the techniques herein, decoding processes for generating unavailable reference pictures which properly handles inter-layer reference pictures signaling in reference picture lists are provided. In particular, in one example, a general decoding process for generating unavailable reference pictures uses inter_layer_ref_pic_flag[listIdx][rplsIdx][i] and correctly sets PicOrderCntVal and nuh_layer_id for the generated picture.

In one example, according to the techniques herein, a general decoding process for generating unavailable reference pictures may be as follows:

This process is invoked once per coded picture when the current picture is a CRA picture with NoIncorrectPicOutputFlag equal to 1 or a GDR picture with NoIncorrectPicOutputFlag equal to 1.

When this process is invoked, the following applies:

For each RefPicList[i][j], with i in the range of 0 to 1, inclusive, and j in the range of 0 to num_ref_entries[i][RplsIdx[i]]−1, inclusive, that is equal to "no reference picture", a picture is generated as specified according to a process of generation of one unavailable picture and the following applies:

If st_ref_pic_flag[i][RplsIdx[i]][j] is equal to 1 and inter_layer_ref_pic_flag[listIdx][rplsIdx][i] is equal to 0, the value of PicOrderCntVal for the generated picture is set equal to RefPicPocList[i][j] and the generated picture is marked as "used for short-term reference".

Otherwise if st_ref_pic_flag[i][RplsIdx[i]][j] is equal to 0 and inter_layer_ref_pic_flag[listIdx][rplsIdx][i] is equal to 0, the value of PicOrderCntVal for the generated picture is set equal to RefPicLtPocList[i][j], the value of slice_pic_order_cnt_lsb for the generated picture is inferred to be equal to (RefPicLtPocList[i][j] & (MaxPicOrderCntLsb−1)), and the generated picture is marked as "used for long-term reference".

Otherwise (if inter_layer_ref_pic_flag[listIdx][rplsIdx][i] is equal to 1), the value of PicOrderCntVal for the generated picture is set equal to RefPicILRPPocList[i][j], the value of slice_pic_order_cnt_lsb for the generated picture is inferred to be equal to (RefPicILRPPocList[i][j]& (MaxPicOrderCntLsb−1)), and the generated picture is marked as "used for long-term reference".

If inter_layer_ref_pic_flag[listIdx][rplsIdx][i] is equal to 1 the value of nuh_layer_id for the generated picture is set equal to RefPicLayerId[i][j].

Otherwise the value of nuh_layer_id for the generated picture is set equal to nuh_layer_id of the current picture.

The value of PictureOutputFlag for the generated reference picture is set equal to 0.

RefPicList[i][j] is set to be the generated reference picture.

In another example, according to the techniques herein, a general decoding process for generating unavailable reference pictures may be as follows:

This process of generating unavailable inter-layer reference pictures is only invoked when the corresponding inter-layer reference picture is equal to "no reference picture". For example, this would be the case if there is no reference picture picA in the DPB with nuh_layer_id equal to RefPicLayerId[i][j] and the same PicOrderCntVal as the current picture.

For each RefPicList[i][j], with i in the range of 0 to 1, inclusive, and j in the range of 0 to num_ref_entries[i][RplsIdx[i]]−1, inclusive, for which inter_layer_ref_pic_flag[listIdx][rplsIdx][i] is equal to 0 or inter_layer_ref_pic_flag[listIdx][rplsIdx][i] is equal to 1 and RefPicList[i][j] is equal to "no reference picture", a picture is generated as specified according to a process of generation of one unavailable picture and the following applies:

If st_ref_pic_flag[i][RplsIdx[i]][j] is equal to 1 and inter_layer_ref_pic_flag[listIdx][rplsIdx][i] is equal to 0, the value of PicOrderCntVal for the generated picture is set equal to RefPicPocList[i][j] and the generated picture is marked as "used for short-term reference".

Otherwise if st_ref_pic_flag[i][RplsIdx[i]][j] is equal to 0 and inter_layer_ref_pic_flag[listIdx][rplsIdx][i] is equal to 0, the value of PicOrderCntVal for the generated picture is set equal to RefPicLtPocList[i][j], the value of slice_pic_order_cnt_lsb for the generated picture is inferred to be equal to (RefPicLtPocList[i][j] & (MaxPicOrderCntLsb−1)), and the generated picture is marked as "used for long-term reference".

Otherwise (if inter_layer_ref_pic_flag[listIdx][rplsIdx][i] is equal to 1), the value of PicOrderCntVal for the generated picture is set equal to RefPicILRPPocList[i][j] the value of slice_pic_order_cnt_lsb for the generated picture is inferred to be equal to (RefPicILRPPocList[i][j] & (MaxPicOrderCntLsb−1)), and the generated picture is marked as "used for long-term reference".

If inter_layer_ref_pic_flag[listIdx][rplsIdx][i] is equal to 1 the value of nuh_layer_id for the generated picture is set equal to RefPicLayerId[i][j].

Otherwise the value of nuh_layer_id for the generated picture is set equal to nuh_layer_id of the current picture.

The value of PictureOutputFlag for the generated reference picture is set equal to 0.

RefPicList[i][j] is set to be the generated reference picture.

In one example, according to the techniques herein, a general decoding process for generating unavailable reference pictures may be as follows:

In this process additionally, after all the slices of the current picture have been decoded the inter-layer reference picture is marked as "used for short-term reference". Thus the marking of this inter-layer reference picture to "used for long-term reference" is only temporary.

For each RefPicList[i][j] with i in the range of 0 to 1, inclusive, and j in the range of 0 to num_ref_entries[i][RplsIdx[i]]−1, inclusive, that is equal to "no reference picture", a picture is generated as specified in subclause to a process of generation of one unavailable picture the following applies:

If st_ref_pic_flag[i][RplsIdx[i]][j] is equal to 1 and inter_layer_ref_pic_flag[listIdx][rplsIdx][i] is equal to 0, the value of PicOrderCntVal for the generated picture is set equal to RefPicPocList[i][j] and the generated picture is marked as "used for short-term reference".

Otherwise if st_ref_pic_flag[i][RplsIdx[i]][j] is equal to 0 and inter_layer_ref_pic_flag[listIdx][rplsIdx][i] is equal to 0, the value of PicOrderCntVal for the generated picture is set equal to RefPicLtPocList[i][j], the value of slice_pic_order_cnt_lsb for the generated picture is inferred to be equal to (RefPicLtPocList[i][j] & (MaxPicOrderCntLsb−1)), and the generated picture is marked as "used for long-term reference".

Otherwise (if inter_layer_ref_pic_flag[listIdx][rplsIdx][i] is equal to 1), the value of PicOrderCntVal for the generated picture is set equal to RefPicILRPPocList[i][j], the value of slice_pic_order_cnt_lsb for the generated picture is inferred to be equal to (RefPicILRPPocList[i][j] & (MaxPicOrderCntLsb−1)), and the generated picture is marked as "used for long-term reference".

After all slices of the current picture have been decoded, this generated picture is marked as "used for short-term reference".

If inter_layer_ref_pic_flag[listIdx][rplsIdx][i] is equal to 1 the value of nuh_layer_id for the generated picture is set equal to RefPicLayerId[i][j].

Otherwise the value of nuh_layer_id for the generated picture is set equal to nuh_layer_id of the current picture.

The value of PictureOutputFlag for the generated reference picture is set equal to 0.

RefPicList[i][j] is set to be the generated reference picture.

In one example, according to the techniques herein, a decoding process for reference picture lists construction may derive RefPicILRPPocList[i][j] which keeps track of the PicOrderCntVal value of the inter-layer reference pictures. Additionally, according to the techniques herein, a in a decoding process for reference picture lists construction the reference picture nuh layer ID (refPicLayerId) may be stored in a global array RefPicLayerId[i][j]. It should be noted that both of these modifications are used for properly setting PicOrderCntVal and nuh_layer_id for the generated picture. In one example, according to the techniques herein, a decoding process for reference picture lists construction may be based on the following:

This process is invoked at the beginning of the decoding process for each slice of a non-IDR picture.

Reference pictures are addressed through reference indices. A reference index is an index into a reference picture list. When decoding an I slice, no reference picture list is used in decoding of the slice data. When decoding a P slice, only reference picture list 0 (i.e., RefPicList[0]), is used in decoding of the slice data. When decoding a B slice, both reference picture list 0 and reference picture list 1 (i.e., RefPicList[1]) are used in decoding of the slice data.

At the beginning of the decoding process for each slice of a non-IDR picture, the reference picture lists RefPicList[0] and RefPicList[1] are derived. The reference picture lists are used in marking of reference pictures or in decoding of the slice data.

NOTE—For an I slice of a non-IDR picture that it is not the first slice of the picture, RefPicList[0] and RefPicList[1] may be derived for bitstream conformance checking purpose, but their derivation is not necessary for decoding of the current picture or pictures following the current picture in decoding order. For a P slice that it is not the first slice of a picture, RefPicList[1] may be derived for bitstream conformance checking purpose, but its derivation is not necessary for decoding of the current picture or pictures following the current picture in decoding order.

The reference picture lists RefPicList[0] and RefPicList[1] are constructed as follows:

```
for( i = 0; i < 2; i++ ) {
    for( j = 0, k = 0, pocBase = PicOrderCntVal; j < num_ref_entries[ i ][ RplsIdx[ i ] ]; j++) {
        if( !inter_layer_ref_pic_flag[ i ][ RplsIdx[ i ] ][ j ] ) {
            if( st_ref_pic_flag[ i ][ RplsIdx[ i ] ][ j ] ) {
                RefPicPocList[ i ][ j ] = pocBase − DeltaPocValSt[ i ][ RplsIdx[ i ] ][ j ]
                if( there is a reference picture picA in the DPB with the same nuh_layer_id as the current picture
                        and PicOrderCntVal equal to RefPicPocList[ i ][ j ] )
                    RefPicList[ i ][ j ] = picA
                else
                    RefPicList[ i ][ j ] = "no reference picture"
                pocBase = RefPicPocList[ i ][ j ]
            } else {
                if( !delta_poc_msb_cycle_lt[ i ][ k ] ) {
                    if( there is a reference picA in the DPB with the same nuh_layer_id as the current picture and
                            PicOrderCntVal & ( MaxPicOrderCntLsb − 1) equal to PocLsbLt[ i ][ k ] )
                        RefPicList[ i ][ j ] = picA
                    else
                        RefPicList[ i ][ j ] = "no reference picture"
                    RefPicLtPocList[ i ][ j ] = PocLsbLt[ i ][ k ]
                } else {
                    if( there is a reference picA in the DPB with the same nuh_layer_id as the current picture and
                            PicOrderCntVal equal to FullPocLt[ i ][ k ] )
                        RefPicList[ i ][ j ] = picA
                    else
                        RefPicList[ i ][ j ] = "no reference picture"
                    RefPicLtPocList[ i ][ j ] = FullPocLt[ i ][ k ]
                }
```

```
        k++
      }
    } else {
      layerIdx = DirectDependentLayerIdx
[ GeneralLayerIdx[ nuh_layer_id ] ][ ilrp_idc[ i ][ RplsIdx ][ j ] ]
      RefPicLayerId[ i ][ j ]  = vps_layer_id[ layerIdx ]
      if( there is a reference picture picA in the DPB with nuh_layer_id equal to
RefPicLayerId[ i ][ j ]  and
              the same PicOrderCntVal as the current picture)
        RefPicList[ i ][ j ] = picA
      else
        RefPicList[ i ][ j ] = "no reference picture"
      RefPicILRPPocList[ i ][ j ] = PicOrderCntVal
    }
  }
}
```

For each i equal to 0 or 1, the first NumRefIdxActive[i] entries in RefPicList[i] are referred to as the active entries in RefPicList[i], and the other entries in RefPicList[i] are referred to as the inactive entries in RefPicList[i].

NOTE—It is possible that a particular picture is referred to by both an entry in RefPicList[0] and an entry in RefPicList[1]. It is also possible that a particular picture is referred to by more than one entry in RefPicList[0] or by more than one entry in RefPicList[1].

NOTE—The active entries in RefPicList[0] and the active entries in RefPicList[1] collectively refer to all reference pictures that may be used for inter prediction of the current picture and one or more pictures that follow the current picture in decoding order. The inactive entries in RefPicList[0] and the inactive entries in RefPicList[1] collectively refer to all reference pictures that are not used for inter prediction of the current picture but may be used in inter prediction for one or more pictures that follow the current picture in decoding order.

NOTE—There may be one or more entries in RefPicList[0] or RefPicList[1] that are equal to "no reference picture" because the corresponding pictures are not present in the DPB. Each inactive entry in RefPicList[0] or RefPicList[0] that is equal to "no reference picture" should be ignored. An unintentional picture loss should be inferred for each active entry in RefPicList[0] or RefPicList[1] that is equal to "no reference picture".

It is a requirement of bitstream conformance that the following constraints apply:

For each i equal to 0 or 1, num_ref_entries[i][RplsIdx[i]] shall not be less than NumRefIdxActive[i].

The picture referred to by each active entry in RefPicList[0] or RefPicList[1] shall be present in the DPB and shall have TemporalId less than or equal to that of the current picture.

The picture referred to by each entry in RefPicList[0] or RefPicList[1] shall not be the current picture and shall have non_reference_picture_flag equal to 0.

An STRP entry in RefPicList[0] or RefPicList[1] of a slice of a picture and an LTRP entry in RefPicList[0] or RefPicList[1] of the same slice or a different slice of the same picture shall not refer to the same picture.

There shall be no LTRP entry in RefPicList[0] or RefPicList[1] for which the difference between the PicOrderCntVal of the current picture and the PicOrderCntVal of the picture referred to by the entry is greater than or equal to $2^{24}$.

Let setOfRefPics be the set of unique pictures referred to by all entries in RefPicList[0] that have the same nuh_layer_id as the current picture and all entries in RefPicList[1] that have the same nub_layer_id as the current picture. The number of pictures in setOfRefPics shall be less than or equal to sps_max_dec_pic_buffering_minus1[HighestTid] and setOfRefPics shall be the same for all slices of a picture.

In a variant example:
    Let setOfRefPics be the set of unique pictures referred to by all entries in RefPicList[0] that have the same nuh_layer_id as the current picture and all entries in RefPicList[1] that have the same nuh_layer_id as the current picture. The number of pictures in setOfRefPics shall be less than or equal to sps_max_dec_pic_buffering_minus1[sps_max_sub_layers_minus1] and setOfRefPics shall be the same for all slices of a picture.

When the current picture is an STSA picture, there shall be no active entry in RefPicList[0] or RefPicList[1] that has TemporalId equal to that of the current picture.

When the current picture is a picture that follows, in decoding order, an STSA picture that has TemporalId equal to that of the current picture, there shall be no picture that has TemporalId equal to that of the current picture included as an active entry in RefPicList[0] or RefPicList[1] that precedes the STSA picture in decoding order.

The picture referred to by each ILRP entry in RefPicList[0] or RefPicList[1] of a slice of the current picture shall be in the same access unit as the current picture.

The picture referred to by each ILRP entry in RefPicList[0] or RefPicList[1] of a slice of the current picture shall be present in the DPB and shall have nuh_layer_id less than that of the current picture.

Each ILRP entry in RefPicList[0] or RefPicList[1] of a slice shall be an active entry.

With respect to the constraint above, regarding the number of pictures in setOfRefPics, JVET-O2001, does not specify which sps_max_dec_pic_buffering_minus1 value is to be used as for the constraint. The value for SPS max decoder picture buffering are signalled in an array, i.e., as sps_max_dec_pic_buffering_minus1[i]. Thus, it is necessary to specify the proper index to the array to use for the constraint. In the above, in one example, either the highest temporal sub-layer to be decoded (HighestTid) or the maximum number of temporal sub-layers in the CVS may be used as the array index for sps_max_dec_pic_buffering_minus1[i] to specify the constraint.

JVET-O2001 provides the following process for specifying a TargetLayerIdList:

For each CVS in the bitstream, the list TargetLayerIdList, which identifies the list of target layers to be decoded, and the variable HighestTid, which identifies the highest temporal sub-layer to be decoded, are specified as follows:

If some external means, not specified in this Specification, is available to set TargetLayerIdList, TargetLayerIdList is set by the external means.

Otherwise, if vps_all_independent_layers_flag is equal to 1, TargetLayerIdList is set to contain only vps_layer_id[0].

Otherwise, TargetLayerIdList is set to contain vps_layer_id[i] for i in the range of 0 to vps_max_layers_minus1, inclusive.

If some external means, not specified in this Specification, is available to set HighestTid, HighestTid is set by the external means.

Otherwise, if, HighestTid is set equal to sps_max_sub_layers_minus1.

That is, referring to Table 1A, in JVET-O2001, the derivation of TargetLayerIdList is defined to utilize VPS syntax elements: vps_all_independent_layers_flag, vps_layer_id[i], and vps_max_layers_minus1. Also, the sub-bitstream extraction process in JVET-O2001 has a defined bitstream conformance that takes as input a target nuh_layer_id list lIdTargetList, which also utilizes VPS syntax elements vps_all_independent_layers_flag, vps_layer_id[i], and vps_max_layers_minus1. However, it is allowed in JVET-O2001 that when sps_video_parameter_set_id is equal to 0, the SPS does not refer to a VPS and no VPS is referred to when decoding each CVS referring to the SPS. It is asserted that for this case, it is necessary to define inference rules for some of the VPS syntax elements when not present. In JVET-O2001, inference rules are defined only for vps_all_independent_layers_flag, and for vps_independent_layer_flag[i] (when vps_all_independent_layers_flag is equal to 1). Thus, according to the techniques herein, inference rules are provided for vps_max_layers_minus1 when not present and vps_layer_id[0] when not present. In one example, according to the techniques herein, the semantics of syntax elements may be based on the following:

vps_max_layers_minus1 plus 1 specifies the maximum allowed number of layers in each CVS referring to the VPS. When not present vps_max_layers_minus1 is inferred to be equal to 0.

vps_layer_id[i] specifies the nuh_layer_id value of the i-th layer. For any two non-negative integer values of m and n, when m is less than n, the value of vps_layer_id[m] shall be less than vps_layer_id[n]. When not present vps_layer_id[0] is inferred to be equal to 0.

Referring again to Table 1A, in JVET-O2001, syntax element vps_output_layer_mode is only signalled in VPS when vps_max_layers_minus1 is greater than 0. Further, there is no inference for vps_output_layer_mode when not signalled. However, syntax element vps_output_layer_mode is used unconditionally for setting the variable PictureOutputFlag (i.e. without checking if vps_output_layer_mode is signalled). That is, JVET-O2001 provides the following process for setting PictureOutputFlag:

PictureOutputFlag is set as follows:
If one of the following conditions is true, PictureOutputFlag is set equal to 0:
the current picture is a RASL picture and NoIncorrectPicOutputFlag of the associated IRAP picture is equal to 1.
gdr_enabled_flag is equal to 1 and the current picture is a GDR picture with NoIncorrectPicOutputFlag equal to 1.
gdr_enabled_flag is equal to 1, the current picture is associated with a GDR picture with NoIncorrectPicOutputFlag equal to 1, and PicOrderCntVal of the current picture is less than RpPicOrderCntVal of the associated GDR picture.
vps_output_layer_mode is equal to 0 and the current access unit contains a picture that has pic_output_flag equal to 1, has nuh_layer_id nuhLid greater than that of the current picture, and does not belong to an output layer (i.e., OutputLayerFlag[GeneralLayerIdx[nuhLid]] is equal to 0).
vps_output_layer_mode is equal to 2 and OutputLayerFlag[GeneralLayerIdx[nuh_layer_id]] is equal to 0.
Otherwise, PictureOutputFlag is set equal to pic_output_flag.

In one example, according to the techniques herein, the conditions to set PictureOutputFlag may be as follows:
PictureOutputFlag is set as follows:
If one of the following conditions is true, PictureOutputFlag is set equal to 0:
the current picture is a RASL picture and NoIncorrectPicOutputFlag of the associated IRAP picture is equal to 1.
gdr_enabled_flag is equal to 1 and the current picture is a GDR picture with NoIncorrectPicOutputFlag equal to 1.
gdr_enabled_flag is equal to 1, the current picture is associated with a GDR picture with NoIncorrectPicOutputFlag equal to 1, and PicOrderCntVal of the current picture is less than RpPicOrderCntVal of the associated GDR picture.
If vps_max_layers_minus1>0 and vps_output_layer_mode is equal to 0 and the current access unit contains a picture that has pic_output_flag equal to 1, has nuh_layer_id nuhLid greater than that of the current picture, and does not belong to an output layer (i.e., OutputLayerFlag[GeneralLayerIdx[nuhLid]] is equal to 0).
If vps_max_layers_minus1>0 and vps_output_layer_mode is equal to 2 and OutputLayerFlag[GeneralLayerIdx[nuh_layer_id]] is equal to 0.
Otherwise, PictureOutputFlag is set equal to pic_output_flag.

In another example, the above condition "If vps_max_layers_minus1>0 and" may be changed to "if sps_video_parameter_set_id is not equal to 0 and", thus:
PictureOutputFlag is set as follows:
If one of the following conditions is true, PictureOutputFlag is set equal to 0:
the current picture is a RASL picture and NoIncorrectPicOutputFlag of the associated TRAP picture is equal to 1.

gdr_enabled_flag is equal to 1 and the current picture is a GDR picture with NoIncorrectPicOutputFlag equal to 1.

gdr_enabled_flag is equal to 1, the current picture is associated with a GDR picture with NoIncorrectPicOutputFlag equal to 1, and PicOrderCntVal of the current picture is less than RpPicOrderCntVal of the associated GDR picture.

If sps_video_parameter_set_id is not equal to 0 and vps_output_layer_mode is equal to 0 and the current access unit contains a picture that has pic_output_flag equal to 1, has nuh_layer_id nuhLid greater than that of the current picture, and does not belong to an output layer (i.e., OutputLayerFlag[GeneralLayerIdx[nuhLid]] is equal to 0).

If sps_video_parameter_set_id is not equal to 0 and vps_output_layer_mode is equal to 2 and OutputLayerFlag[GeneralLayerIdx[nuh_layer_id]] is equal to 0.

Otherwise, PictureOutputFlag is set equal to pic_output_flag.

In one example, according to the techniques herein, the semantics of syntax element vps_output_layers_mode may be based on the following:

vps_output_layers_mode equal to 0 specifies that only the highest layer is output. vps_output_layer_mode equal to 1 specifies that all layers are output. vps_output_layer_mode equal to 2 specifies that the layers that are output are the layers with vps_output_layer_flag[i] equal to 1. The value of vps_output_layers_mode shall be in the range of 0 to 2, inclusive. The value 3 of vps_output_layer_mode is reserved for future use by ITU-T I ISO/IEC. When not present vps_output_layer_mode is inferred to be equal to 0.

In a variant: When not present vps_output_layer_mode is inferred to be equal to 1.

Further, referring to the semantics of syntax element vps_output_layer_flag above, in JVET-O2001, the variable OutputLayerFlag for the vps_max_layers_minus1-th layer is always set equal to 1. It should be noted that JVET-O2001 already supports specifying vps_output_layers_mode values which indicate that only the highest layer is output or that all layers are output. When vps_output_layers_mode is equal to 2, the layers that are output are the layers with vps_output_layer_flag[i] equal to 1. Thus, in one example, according to the techniques herein in this mode, for flexibility, it is proposed to signal the vps_output_layer_flag[vps_max_layers_minus1], instead of always deriving its value to be equal to 1. Additionally, since the value 3 for vps_output_layer_mode is reserved for future use, defining its behaviour now is asserted to be not a good design practice. Thus, it is proposed to modify the last else condition to else if (vps_output_layers_mode==2) when setting the value of OutputLayerFlag[i] to vps_output_layer_flag[i]. That is, according to the techniques herein, in one example, the derivations of the variable OutputLayerFlag may be based on the following the semantics of syntax elements vps_output_layers_mode and vps_output_layer_flag:

vps_output_layers_mode equal to 0 specifies that only the highest layer is output. vps_output_layer_mode equal to 1 specifies that all layers are output. vps_output_layer_mode equal to 2 specifies that the layers that are output are the layers with vps_output_layer_flag[i] equal to 1. The value of vps_output_layers_mode shall be in the range of 0 to 2, inclusive. The value 3 of vps_output_layer_mode is reserved for future use by ITU-T|ISO/IEC. When not present vps_output_layer_mode is inferred to be equal to 0.

vps_output_layer_flag[i] equal to 1 specifies that the i-th layer is output. vps_output_layer_flag[i] equal to 0 specifies that the i-th layer is not output. The list OutputLayerFlag[i], for which the value 1 specifies that the i-th layer is output and the value 0 specifies that the i-th layer is not output, is derived as follows:

OutputLayerFlag[vps_max_layers_minus1]=1

```
for( i = 0; i < vps_max_layers_minus1; i++ )
    if( vps_output_layers_mode   ==   0 )
        OutputLayerFlag[ i ] = 0
    else if( vps_output_layers_mode   ==   1 )
        OutputLayerFlag[ i ] = 1
    else if( vps_output_layers_mode   ==   2 )
        OutputLayerFlag[ i ] = vps_output_layer_flag[ i ]
if( vps_output_layers_mode   ==   2)
    OutputLayerFlag[ vps_max_layers_minus1 ] =
        vps_output_layer_flag[ vps_max_layers_minus1 ]
```

It should be noted that according to these semantics, the following for loop in the video_parameter_set_rbsp( ) syntax structure:

for(i=0; i<vps_max_layers_minus1; i++)

is modified as follows:

for(i=0; i<=vps_max_layers_minus1; i++)

Further, in JVET-O2001, the list TargetLayerIdList, which identifies the list of target layers to be decoded is set to either a single layer or multiple layers. It is asserted that under certain conditions (e.g., when TargetLayerIdList is set to multiple layers), the setting of the variable HighestTid, which identifies the highest temporal sub-layer to be decoded is unclear in JVET-O2001. This is because in this case there are multiple SPSes (one for each layer). In one example, according to the techniques here in, the derivation of the variable HighestTid correctly identifies the highest temporal sub-layer to be decoded. That is, in one example, according to the techniques, the list TargetLayerIdList may be specified as follows:

For each CVS in the bitstream, the list TargetLayerIdList, which identifies the list of target layers to be decoded, and the variable HighestTid, which identifies the highest temporal sub-layer to be decoded, are specified as follows:

If some external means, not specified in this Specification, is available to set TargetLayerIdList, TargetLayerIdList is set by the external means.

Otherwise, if vps_all_independent_layers_flag is equal to 1, TargetLayerIdList is set to contain only vps_layer_id[0].

Otherwise, TargetLayerIdList is set to contain vps_layer_id[i] for i in the range of 0 to vps_max_layers_minus1, inclusive.

If some external means, not specified in this Specification, is available to set HighestTid, HighestTid is set by the external means.

Otherwise, if vps_all_independent_layers_flag is equal to 1, HighestTid is set equal to sps_max_sub_layers_minus1 from the SPS with nuh_layer_id equal to vps_layer_id[0].

Otherwise, HighestTid is set equal to maximum value of sps_max_sub_layers_minus1 out of all the SPS with nuh_layer_id equal to vps_layer_id[i] for i in the range of 0 to vps_max_layers_minus1, inclusive.

In one example, according to the techniques, the list TargetLayerIdList may be specified as follows:

For each CVS in the bitstream, the list TargetLayerIdList, which identifies the list of target layers to be decoded, and the variable HighestTid, which identifies the highest temporal sub-layer to be decoded, are specified as follows:
- If some external means, not specified in this Specification, is available to set TargetLayerIdList, TargetLayerIdList is set by the external means.
- Otherwise, if vps_all_independent_layers_flag is equal to 1, TargetLayerIdList is set to contain only vps_layer_id[0].
- Otherwise, TargetLayerIdList is set to contain vps_layer_id[i] for i in the range of 0 to vps_max_layers_minus1, inclusive.
- If some external means, not specified in this Specification, is available to set HighestTid, HighestTid is set by the external means.
- Otherwise, HighestTid is set equal to sps_max_sub_layers_minus1 from the SPS with nuh_layer_id equal to vps_layer_id[0].

In one example, according to the techniques, the list TargetLayerIdList may be specified as follows:

For each CVS in the bitstream, the list TargetLayerIdList, which identifies the list of target layers to be decoded, and the variable HighestTid, which identifies the highest temporal sub-layer to be decoded, are specified as follows:
- If some external means, not specified in this Specification, is available to set TargetLayerIdList, TargetLayerIdList is set by the external means.
- Otherwise, if vps_all_independent_layers_flag is equal to 1, TargetLayerIdList is set to contain only vps_layer_id[0].
- Otherwise, TargetLayerIdList is set to contain vps_layer_id[i] for i in the range of 0 to vps_max_layers_minus1, inclusive.
- If some external means, not specified in this Specification, is available to set HighestTid, HighestTid is set by the external means.
- Otherwise, if vps_all_independent_layers_flag is equal to 1, HighestTid is set equal to sps_max_sub_layers_minus1 from the SPS with nuh_layer_id equal to vps_layer_id[0].
- Otherwise, HighestTid[i] for the i-th layer with nuh_layer_id equal to vps_layer_id[i] is set equal to sps_max_sub_layers_minus1 from the SPS with nuh_layer_id equal to vps_layer_id[i] for i in the range of 0 to vps_max_layers_minus1, inclusive. In this case each layer has a different HighestTid[i] indicating the highest temporal sub-layer to be decoded for that layer.

In one example, according to the techniques, the list TargetLayerIdList may be specified as follows:

For each CVS in the bitstream, the list TargetLayerIdList, which identifies the list of target layers to be decoded, and the variable HighestTid, which identifies the highest temporal sub-layer to be decoded, are specified as follows:
- If some external means, not specified in this Specification, is available to set TargetLayerIdList, TargetLayerIdList is set by the external means.
- Otherwise, if vps_all_independent_layers_flag is equal to 1, TargetLayerIdList is set to contain only vps_layer_id[0].
- Otherwise, TargetLayerIdList is set to contain vps_layer_id[i] for i in the range of 0 to vps_max_layers_minus1, inclusive.
- If some external means, not specified in this Specification, is available to set HighestTid, HighestTid is set by the external means.
- Otherwise, if vps_all_independent_layers_flag is equal to 1, HighestTid is set equal to sps_max_sub_layers_minus1 from the SPS with nuh_layer_id equal to vps_layer_id[0].
- Otherwise, HighestTid is set equal to minimum value of sps_max_sub_layers_minus1 out of all the SPS with nuh_layer_id equal to vps_layer_id[i] for i in the range of 0 to vps_max_layers_minus1, inclusive.

In one example, according to the techniques, the list TargetLayerIdList may be specified as follows:

For each CVS in the bitstream, the list TargetLayerIdList, which identifies the list of target layers to be decoded, and the variable HighestTid, which identifies the highest temporal sub-layer to be decoded, are specified as follows:
- If some external means, not specified in this Specification, is available to set TargetLayerIdList, TargetLayerIdList is set by the external means.
- Otherwise, if sps_video_parameter_set_id is equal to 0, TargetLayerIdList is set to contain only layer with lowest nuh_layer_id value.
- Otherwise if vps_all_independent_layers_flag is equal to 1, TargetLayerIdList is set to contain only vps_layer_id[0].
- Otherwise, TargetLayerIdList is set to contain vps_layer_id[i] for i in the range of 0 to vps_max_layers_minus1, inclusive.
- If some external means, not specified in this Specification, is available to set HighestTid, HighestTid is set by the external means.
- Otherwise, if sps_video_parameter_set_id is equal to 0, HighestTid is set equal to sps_max_sub_layers_minus1 of the SPS with lowest nuh_layer_id value.
- Otherwise, if vps_all_independent_layers_flag is equal to 1, HighestTid is set equal to sps_max_sub_layers_minus1 from the SPS with nuh_layer_id equal to vps_layer_id[0].
- Otherwise, HighestTid is set equal to maximum value of sps_max_sub_layers_minus1 out of all the SPS with nuh_layer_id equal to vps_layer_id[i] for i in the range of 0 to vps_max_layers_minus1, inclusive.

In one example, according to the techniques, the list TargetLayerIdList may be specified as follows:

For each CVS in the bitstream, the list TargetLayerIdList, which identifies the list of target layers to be decoded, and the variable HighestTid, which identifies the highest temporal sub-layer to be decoded, are specified as follows:
- If some external means, not specified in this Specification, is available to set TargetLayerIdList, TargetLayerIdList is set by the external means.
- Otherwise, if sps_video_parameter_set_id is equal to 0, TargetLayerIdList is set to contain only layer with lowest nuh_layer_id value for which SPS has sps_video_parameter_set_id equal to 0.
- Otherwise if vps_all_independent_layers_flag is equal to 1, TargetLayerIdList is set to contain only vps_layer_id[0].

Otherwise, TargetLayerIdList is set to contain vps_layer_id[i] for i in the range of 0 to vps_max_layers_minus1, inclusive.

If some external means, not specified in this Specification, is available to set HighestTid, HighestTid is set by the external means.

Otherwise, if sps_video_parameter_set_id is equal to 0, HighestTid is set equal to sps_max_sub_layers_minus1 of the SPS with lowest nuh_layer_id value and sps_video_parameter_set_id equal to 0.

Otherwise, if vps_all_independent_layers_flag is equal to 1, HighestTid is set equal to sps_max_sub_layers_minus1 from the SPS with nuh_layer_id equal to vps_layer_id[0].

Otherwise, HighestTid is set equal to maximum value of sps_max_sub_layers_minus1 out of all the SPS with nuh_layer_id equal to vps_layer_id[i] for i in the range of 0 to vps_max_layers_minus1, inclusive.

In one example, according to the techniques, the list TargetLayerIdList may be specified as follows:

For each CVS in the bitstream, the list TargetLayerIdList, which identifies the list of target layers to be decoded, and the variable HighestTid, which identifies the highest temporal sub-layer to be decoded, are specified as follows:

If some external means, not specified in this Specification, is available to set TargetLayerIdList, TargetLayerIdList is set by the external means.

Otherwise, if there is one SPS and sps_video_parameter_set_id is equal to 0, TargetLayerIdList is set to contain only layer with nuh_layer_id value equal to nuh_layer_id of the SPS.

Otherwise if vps_all_independent_layers_flag is equal to 1, TargetLayerIdList is set to contain only vps_layer_id[0].

Otherwise, TargetLayerIdList is set to contain vps_layer_id[i] for i in the range of 0 to vps_max_layers_minus1, inclusive.

If some external means, not specified in this Specification, is available to set HighestTid, HighestTid is set by the external means.

Otherwise, if there is one SPS and sps_video_parameter_set_id is equal to 0, HighestTid is set equal to sps_max_sub_layers_minus1 of the SPS.

Otherwise, if vps_all_independent_layers_flag is equal to 1, HighestTid is set equal to sps_max_sub_layers_minus1 from the SPS with nuh_layer_id equal to vps_layer_id[0].

Otherwise, HighestTid is set equal to maximum value of sps_max_sub_layers_minus1 out of all the SPS with nuh_layer_id equal to vps_layer_id[i] for i in the range of 0 to vps_max_layers_minus1, inclusive.

In the above description: the condition "if sps_video_parameter_set_id is equal to 0," could mean that sps_video_parameter_set_id is equal to 0 for each SPS in the bitstream. In other example, sps_video_parameter_set_id is equal to 0 for some of the SPSes in the bitstream.

In one example, in the above description: "only layer with lowest nuh_layer_id value" may be determined by examining the entire bitstream. In another example, "only layer with lowest nuh_layer_id value" may be changed to "only layer with nuh_layer_id equal to the lowest value of nuh_layer_id value amongst all the SPS" in the bitstream.

In one example, in the above description: "only layer with lowest nuh_layer_id value" may be determined by examining the entire bitstream. In another example, "only layer with lowest nuh_layer_id value" may be changed to "only layer with nuh_layer_id equal to the lowest value of nuh_layer_id value amongst all the SPS with sps_video_parameter_set_id is equal to 0," in the bitstream.

In one example, according to the techniques herein, syntax element vps_max_sub_layers_minus1 may be signaled in the VPS and a conditional conformance constraint may be used for syntax element sps_max_sub_layers_minus1 for the derivation of the variable HighestTid. That is, in one example, syntax element vps_max_sub_layers_minus1 may be signaled in the VPS as follows:

| | Descriptor |
|---|---|
| video_parameter_set_rbsp( ) { | |
|   vps_video_parameter_set_id | u(4) |
|   vps_max_layers_minus1 | u(6) |
|   vps_max_sub_layers_minus1 | u(3) |
|   if( vps_max_layers_minus1 > 0 ) | |
|     vps_all_independent_layers_flag | u(1) |

With semantics of vps_max_sub_layers_minus1 and sps_max_sub_layers_minus1 based on the following:

vps_max_sub_layers_minus1 plus 1 specifies the maximum number of temporal sub-layers that may be present in each CVS referring to the VPS. The value of vps_max_sub_layers_minus1 shall be in the range of 0 to 6, inclusive.

sps_max_sub_layers_minus1 plus 1 specifies the maximum number of temporal sub-layers that may be present in each CVS referring to the SPS. The value of sps_max_sub_layers_minus1 shall be in the range of 0 to 6, inclusive. If sps_video_parameter_set_id is not equal to 0, the value of sps_max_sub_layers_minus1 shall be less than or equal to vps_max_sub_layers_minus1.

Where, the list TargetLayerIdList may be specified as follows:

For each CVS in the bitstream, the list TargetLayerIdList, which identifies the list of target layers to be decoded, and the variable HighestTid, which identifies the highest temporal sub-layer to be decoded, are specified as follows:

If some external means, not specified in this Specification, is available to set TargetLayerIdList, TargetLayerIdList is set by the external means.

Otherwise, if vps_all_independent_layers_flag is equal to 1, TargetLayerIdList is set to contain only vps_layer_id[0].

Otherwise, TargetLayerIdList is set to contain vps_layer_id[i] for i in the range of 0 to vps_max_layers_minus1, inclusive.

If some external means, not specified in this Specification, is available to set HighestTid, HighestTid is set by the external means.

Otherwise, if vps_all_independent_layers_flag is equal to 1, HighestTid is set equal to sps_max_sub_layers_minus1 from the SPS with nuh_layer_id equal to vps_layer_id[0].

Otherwise, HighestTid[i] is set equal to vps_max_sub_layers_minus1.

In another example, the list TargetLayerIdList may be specified as follows:

For each CVS in the bitstream, the list TargetLayerIdList, which identifies the list of target layers to be decoded, and the variable HighestTid, which identifies the highest temporal sub-layer to be decoded, are specified as follows:
  If some external means, not specified in this Specification, is available to set TargetLayerIdList, TargetLayerIdList is set by the external means.
  Otherwise, if vps_all_independent_layers_flag is equal to 1, TargetLayerIdList is set to contain only vps_layer_id[0].
  Otherwise, TargetLayerIdList is set to contain vps_layer_id[i] for i in the range of 0 to vps_max_layers_minus1, inclusive.
  If some external means, not specified in this Specification, is available to set HighestTid, HighestTid is set by the external means.
  Otherwise, if HighestTid is set equal to vps_max_sub_layers_minus1.
In one example, according to the techniques herein, the semantics of syntax element sps_video_parameter_set_id may be based on the following:
sps_video_parameter_set_id, when greater than 0, specifies the value of vps_video_parameter_set_id for the VPS referred to by the SPS. When sps_video_parameter_set_id is equal to 0, the SPS does not refer to a VPS and no VPS is referred to when decoding each CVS referring to the SPS.
When sps_video_parameter_set_id is equal to 0, vps_max_layers_minus1 is inferred to be equal to 0.
When sps_video_parameter_set_id is equal to 0, vps_layer_id[0] is inferred to be equal to 0.
When sps_video_parameter_set_id is equal to 0, vps_all_independent_layers_flag is inferred to be equal to 1.
In a variant example:
When sps_video_parameter_set_id is equal to 0, vps_layer_id[0] is inferred to be equal to nuh_layer_id (of the SPS).
In a variant example:
When sps_video_parameter_set_id is equal to 0, vps_layer_id[0] is inferred to be equal to nuh_layer_id with the lowest value amongst all the SPEs in the bitstream (or provided by external means).
In a variant example:
When sps_video_parameter_set_id is equal to 0, vps_layer_id[0] is inferred to be equal to nuh_layer_id with the lowest value amongst all the SPSes in the bitstream (or provided by external means) with sps_video_parameter_set_id is equal to 0.
In a variant example:
When sps_video_parameter_set_id is equal to 0 the VPS syntax elements not present are inferred to have the values as specified when they are not present.
In one example, according to the techniques herein, the signalling of some of the syntax elements in VPS for may be moved for better byte alignment and for ease of parsing. The moving of vps_constraint_info_present_flag and vps_reserved_zero_7bits up provided below makes the first 4 fields of VPS fixed length and together they are byte aligned. This also allows knowing the position of general_constraint_info( ) (if present) earlier in VPS, without conditional syntax parsing of various for loops. That is, in one example, according to the techniques herein, the syntax of the video_parameter_set_rbsp( ) may be as provided in Table 13.

TABLE 13

| | Descriptor |
|---|---|
| video_parameter_set_rbsp( ) { | |
|   vps_video_parameter_set_id | u(4) |
|   vps_max_layers_minus1 | u(6) |
|   vps_constraint_info_present_flag | u(1) |
|   vps_reserved_zero_7bits | u(7) |
|   if( vps_constraint_info_present_flag ) | |
|     general_constraint_info( ) | |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) | |
|         for( j = 0; j < i; j++ ) | |
|           vps_direct_dependency_flag[ i ][ j ] | u(1) |
|     } | |
|   } | |
|   if( vps_max_layers_minus1 > 0 ) { | |
|     vps_output_layers_mode | u(2) |
|     if( vps_output_layers_mode == 2 ) | |
|       for( i = 0; i < vps_max_layers_minus1; i++ ) | |
|         vps_output_layer_flag[ i ] | u(1) |
|   } | |
|   vps_extension_flag | u(1) |
|   if( vps_extension_flag ) | |
|     while( more_rbsp_data( ) ) | |
|       vps_extension_data_flag | u(1) |
|   rbsp_trailing_bits( ) | |
| } | |

Further, in one example, additionally according to the techniques herein, these syntax elements (vps_constraint_info_present_flag and vps_reserved_zero_7 bits, and when present general_constraint_info( ) may be signaled only when vps_max_layers_minus1 is greater than zero. That is as follows:

```
if( vps_max_layers_minus1 > 0 ) {
  vps_constraint_info_present_flag
  vps_reserved_zero_7bits
  if( vps_constraint_info_present_flag )
    general_constraint_info( )
}
```

It should be noted that otherwise, this information is already available in the SPS for the single layer case.

In this manner, source device 102 represents an example of a device configured to signal two bits having values which indicate whether an entry in a reference picture list is one of: a short term reference picture entry having a value greater than or equal to 0, a short term reference picture entry having a value less 0, a inter layer reference picture, or a long term reference picture entry.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I$^2$C, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, $I^2C$, or any other logical and physical structure that may be used to interconnect peer devices. Data decapsulator 123 may be configured to receive and parse any of the example syntax structures described herein.

Video decoder 124 may include any device configured to receive a bitstream (e.g., a sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
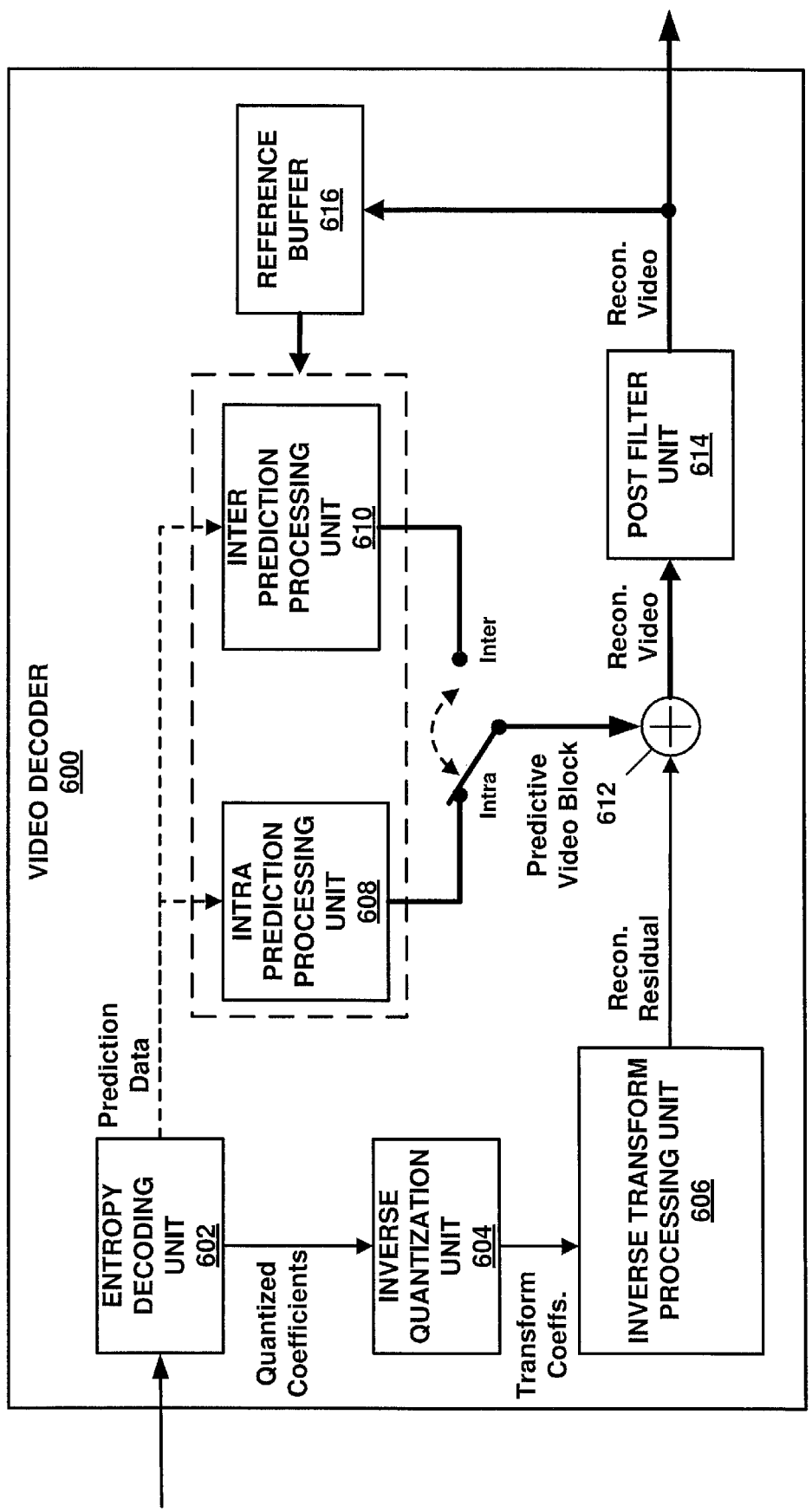
FIG. 6 is a block diagram illustrating an example of a video decoder that may be configured to decode video data according to one or more techniques of this disclosure.

FIG. 6 is a block diagram illustrating an example of a video decoder that may be configured to decode video data according to one or more techniques of this disclosure (e.g., the decoding process for reference-picture list construction described above). In one example, video decoder 600 may be configured to decode transform data and re-construct residual data from transform coefficients based on decoded transform data. Video decoder 600 may be configured to perform intra prediction decoding and inter prediction decoding and, as such, may be referred to as a hybrid decoder. Video decoder 600 may be configured to parse any combination of the syntax elements described above in Tables 1-13. Video decoder 600 may decode a picture based on or according to the processes described above, and further based on parsed values in Tables 1-13.

In the example illustrated in FIG. 6, video decoder 600 includes an entropy decoding unit 602, inverse quantization unit and transform coefficient processing unit 604, intra prediction processing unit 606, inter prediction processing unit 608, summer 610, post filter unit 612, and reference buffer 614. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 6, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 6, entropy decoding unit 602 may determine a quantization parameter, quantized coefficient values, transform data, and predication data from a bitstream. In the example, illustrated in FIG. 6, inverse quantization unit and transform coefficient processing unit 604 receives a quantization parameter, quantized coefficient values, transform data, and predication data from entropy decoding unit 602 and outputs reconstructed residual data.

Referring again to FIG. 6, reconstructed residual data may be provided to summer 610 Summer 610 may add reconstructed residual data to a predictive video block and generate reconstructed video data. A predictive video block may be determined according to a predictive video technique (i.e., intra prediction and inter frame prediction). Intra prediction processing unit 606 may be configured to receive intra prediction syntax elements and retrieve a predictive video block from reference buffer 614. Reference buffer 614 may include a memory device configured to store one or more frames of video data. Intra prediction syntax elements may identify an intra prediction mode, such as the intra prediction modes described above. Inter prediction processing unit 608 may receive inter prediction syntax elements and generate motion vectors to identify a prediction block in one or more reference frames stored in reference buffer 616. Inter prediction processing unit 608 may produce motion compensated blocks, possibly performing interpolation based on interpolation filters. Identifiers for interpolation filters to be used for motion estimation with sub-pixel precision may be included in the syntax elements. Inter prediction processing unit 608 may use interpolation filters to calculate interpolated values for sub-integer pixels of a reference block. Post filter unit 614 may be configured to perform filtering on reconstructed video data. For example, post filter unit 614 may be configured to perform deblocking and/or Sample Adaptive Offset (SAO) filtering, e.g., based on parameters specified in a bitstream. Further, it should be noted that in some examples, post filter unit 614 may be configured to perform proprietary discretionary filtering (e.g., visual enhancements, such as, mosquito noise reduction). As illustrated in FIG. 6, a reconstructed video block may be output by video decoder 600. In this manner, video decoder 600 represents an example of a device configured to parse a syntax element indicating a profile corresponding to a coded video sequence, parse two bits having values which indicate whether an entry in a reference picture list is one of: a short term reference picture entry having a value greater than or equal to 0, a short term reference picture entry having a value less 0, a inter layer reference picture, or a long term reference picture entry.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

SUMMARY

In one example, a method of signaling a reference picture list for video data, the method comprising: signaling two bits having values which indicate whether an entry in a reference picture list is one of: a short term reference picture entry having a value greater than or equal to 0; a short term reference picture entry having a value less 0; a inter layer reference picture; or a long term reference picture entry.

In one example, a method of decoding video data, the method comprising: parsing two bits having values which indicate whether an entry in a reference picture list is one of: a short term reference picture entry having a value greater than or equal to 0; a short term reference picture entry having a value less 0; a inter layer reference picture; or a long term reference picture entry.

In one example, the method, wherein the twos are two one bit syntax elements.

In one example, the method, wherein one of the syntax elements is conditionally present.

In one example, a device comprising one or more processors configured to perform any and all combinations of the steps.

In one example, the device, wherein the device includes a video encoder.

In one example, the device, wherein the device includes a video decoder.

In one example, a system comprising: the device including a video encoder; and the device including a video decoder.

In one example, an apparatus comprising means for performing any and all combinations of the steps.

In one example, a non-transitory computer-readable storage medium comprising instructions stored thereon that, when executed, cause one or more processors of a device to perform any and all combinations of the steps.

In one example, a method of decoding video data, the method comprising: receiving a video parameter set; parsing a first syntax element in the video parameter set, wherein the first syntax element plus one specifies a maximum number of temporal sub-layers that may be present in a layer specified by the video parameter set; receiving a sequence parameter set; parsing a second syntax element in the sequence parameter set, wherein the second syntax element specifies the sequence parameter set refers to the video parameter set or the sequence parameter set does not refer to the video parameter set; and parsing a third syntax element in the sequence parameter set, wherein the third syntax element plus one specifies a maximum number of temporal sub-layers that is present in each coded video sequence referring to the sequence parameter set, wherein: a value of the third syntax element is in a range of 0 to the first syntax element, in the case that the second syntax element is greater than zero, and a value of the third syntax element is in a range of 0 to 6, in a case that the second syntax element is equal to zero.

In one example, the method, wherein a value of a highest temporal sub-layer to be decoded is set to be equal to the first syntax element.

In one example, the method, further comprising parsing a fourth syntax element in the video parameter set, wherein the fourth syntax element specifies all layers are independently coded without using inter-layer prediction or one or more layers may use inter-layer prediction, wherein in a case that the fourth syntax element does not present, a value of the fourth syntax element is inferred to be equal to 1.

In one example, the method, wherein in a case that the second syntax element is equal to zero, a value of a fifth syntax element in the video parameter set is inferred to be equal to zero, wherein the fifth syntax element plus one specifies a maximum allowed number of layers in each coded video sequence referring to the video parameter set.

In one example, a method of encoding video data, the method comprising: signaling a video parameter set; and signaling a sequence parameter set, wherein: the video parameter set includes a first syntax element in the video parameter set, wherein the first syntax element plus one specifies a maximum number of temporal sub-layers that may be present in a layer specified by the video parameter set, the sequence parameter set includes (i) a second syntax element, wherein the second syntax element specifies the sequence parameter set refers to the video parameter set or the sequence parameter set does not refer to the video parameter set and (ii) a third syntax element, wherein the third syntax element plus one specifies a maximum number of temporal sub-layers that is present in each coded video sequence referring to the sequence parameter set, a value of the third syntax element is in a range of 0 to the first syntax element, in the case that the second syntax element is greater than zero, and a value of the third syntax element is in a range of 0 to 6, in a case that the second syntax element is equal to zero.

In one example, a device comprising: a processor, and a memory associated with the processor; wherein the processor is configured to perform the following steps: receiving a video parameter set; parsing a first syntax element in the video parameter set, wherein the first syntax element plus one specifies a maximum number of temporal sub-layers that may be present in a layer specified by the video parameter set; receiving a sequence parameter set; parsing a second syntax element in the sequence parameter set, wherein the second syntax element specifies the sequence parameter set refers to the video parameter set or the sequence parameter set does not refer to the video parameter set; and parsing a third syntax element in the sequence parameter set, wherein the third syntax element plus one specifies a maximum number of temporal sub-layers that is present in each coded video sequence referring to the sequence parameter set, wherein: a value of the third syntax element is in a range of 0 to the first syntax element, in the case that the second syntax element is greater than zero, and a value of the third syntax element is in a range of 0 to 6, in a case that the second syntax element is equal to zero.

CROSS REFERENCE

This Nonprovisional application claims priority under 35 U.S.C. § 119 on provisional Application No. 62/897,238 on Sep. 6, 2019, No. 62/902,177 on Sep. 18, 2019, No. 62/903,909 on Sep. 22, 2019, the entire contents of which are hereby incorporated by reference.

The invention claimed is:

1. A method of decoding video data, the method comprising:
receiving a video parameter set;
parsing a first syntax element in the video parameter set wherein the first syntax element plus one specifies a maximum allowed number of layers in each coded video sequence referring to the video parameter set;
parsing a second syntax element in the video parameter set, wherein the second syntax element plus one specifies a maximum number of temporal sub-layers that may be present in a layer specified by the video parameter set;
parsing a third syntax element in the video parameter set, wherein a value of the third syntax element equal to 1 specifies that all layers are independently coded without using inter-layer prediction and the value of the third syntax element equal to 0 specifies that one or more of layers may use inter-layer prediction;
receiving a sequence parameter set;
parsing a fourth syntax element in the sequence parameter set; and
parsing a fifth syntax element in the sequence parameter set, wherein the fifth syntax element plus one specifies a maximum number of temporal sub-layers that may be present in each coded video sequence referring to the sequence parameter set,
wherein,
in a case that a value of the fourth syntax element is greater than 0,
the sequence parameter set refers to the video parameter set and a value of the fifth syntax element is in a range of 0 to a value of the second syntax element, and
in a case that the value of the fourth syntax element is equal to 0,
the sequence parameter set does not refer to the video parameter set, a value of the first syntax element is inferred to be equal to 0, the value of the third syntax element is inferred to be equal to 1, the value of the fifth syntax element is in a range of 0 to 6, and a value of a highest temporal sub-layer to be decoded is set equal to the value of the fifth syntax element.

2. A device comprising:
a processor, and
a memory associated with the processor; wherein the processor is configured to perform the following steps:
receiving a video parameter set;
parsing a first syntax element in the video parameter set, wherein the first syntax element plus one specifies a maximum allowed number of layers in each coded video sequence referring to the video parameter set;
parsing a second syntax element in the video parameter set, wherein the second syntax element plus one specifies a maximum number of temporal sub-layers that may be present in a layer specified by the video parameter set;
parsing a third syntax element in the video parameter set, wherein a value of the third syntax element equal to 1 specifies that all layers are independently coded without using inter-layer prediction and the value of the third syntax element equal to 0 specifies that one or more of layers may use inter-layer prediction;

receiving a sequence parameter set;
parsing a fourth syntax element in the sequence parameter set; and
parsing a fifth syntax element in the sequence parameter set, wherein the fifth syntax element plus one specifies a maximum number of temporal sub-layers that may be present in each coded video sequence referring to the sequence parameter set,
wherein,
in a case that a value of the fourth syntax element is greater than 0,
  the sequence parameter set refers to the video parameter set and a value of the fifth syntax element is in a range of 0 to a value of the second syntax element, and
in a case that the value of the fourth syntax element is equal to 0,
  the sequence parameter set does not refer to the video parameter set, a value of the first syntax element is inferred to be equal to 0, the value of the third syntax element is inferred to be equal to 1, the value of the fifth syntax element is in a range of 0 to 6, and a value of a highest temporal sub-layer to be decoded is set equal to the value of the fifth syntax element.

* * * * *